(12) United States Patent
Peterson et al.

(10) Patent No.: US 8,511,703 B2
(45) Date of Patent: Aug. 20, 2013

(54) SLIDING HITCH ASSEMBLY

(75) Inventors: Rodney Peterson, Elkhart, IN (US);
Christopher Moore, Elkhart, IN (US);
Dennis A. Castagnola, West Linn, OR
(US); David Lamar Hoover,
Constantine, MI (US)

(73) Assignee: The Coast Distribution System, Inc.,
Morgan Hill, CA (US)

( * ) Notice: Subject to any disclaimer, the term of this patent is extended or adjusted under 35 U.S.C. 154(b) by 174 days.

(21) Appl. No.: 12/900,311

(22) Filed: Oct. 7, 2010

(65) Prior Publication Data

US 2011/0109061 A1    May 12, 2011

Related U.S. Application Data

(60) Provisional application No. 61/249,549, filed on Oct. 7, 2009.

(51) Int. Cl.
*B62D 53/10*    (2006.01)
(52) U.S. Cl.
USPC ........................................ 280/438.1; 280/441
(58) Field of Classification Search
USPC ................................ 280/438.1, 441, 433, 434
See application file for complete search history.

(56) References Cited

U.S. PATENT DOCUMENTS

| | | | | |
|---|---|---|---|---|
| 3,826,516 A | * | 7/1974 | Weber | 280/407 |
| 4,429,892 A | | 2/1984 | Frampton et al. | |
| 4,579,364 A | * | 4/1986 | Kranz | 280/507 |
| 4,919,445 A | | 4/1990 | Robey | |
| 5,044,651 A | | 9/1991 | Weikel | |
| 5,344,173 A | * | 9/1994 | Beeler et al. | 280/438.1 |
| 5,449,191 A | | 9/1995 | Cattau | |
| 5,529,329 A | * | 6/1996 | McCoy | 280/438.1 |
| D380,719 S | | 7/1997 | Lindenman et al. | |
| 5,707,070 A | | 1/1998 | Lindenman et al. | |

(Continued)

FOREIGN PATENT DOCUMENTS

AU    2007200421    8/2007
CA    2576427    8/2007

OTHER PUBLICATIONS

Canadian Intellectual Property Office, Official Action for Canadian Application No. 2,717,122, Feb. 23, 2012, 2 pages.

*Primary Examiner* — Kevin Hurley
*Assistant Examiner* — Michael Stabley
(74) *Attorney, Agent, or Firm* — Kolisch Hartwell, PC

(57) ABSTRACT

Examples of sliding hitch assemblies, and locking mechanisms therefor are disclosed. Sliding hitch assemblies include a pair of slide rails slidably supporting a fifth wheel. Each of the slide rails in turn includes a driving position locking pin that selectively locks the fifth wheel in a driving position, and a maneuvering position locking pin that selectively locks the fifth wheel in a maneuvering position. A cam member is slidably mounted inside each slide rail, and includes a first cam surface that unlocks the driving position locking pin when the cam member is in a first position, and a second cam surface that unlocks the maneuvering position locking pin when the cam member is in a second position. The fifth wheel is mounted on a pair of downwardly facing U-shaped members slidably supported on the slide rails, and a wear block is interposed each slide rail and a corresponding one of the U-shaped members. An adjustable element may be moved relative to the corresponding one of the U-shaped members to stay adjacent the one of slide rails as the wear block wears during use.

28 Claims, 27 Drawing Sheets

(56) References Cited

U.S. PATENT DOCUMENTS

| | | | |
|---|---|---|---|
| D395,025 S | 6/1998 | Lindenman et al. | |
| 5,772,229 A * | 6/1998 | Cattau | 280/438.1 |
| 5,839,745 A * | 11/1998 | Cattau et al. | 280/434 |
| 6,247,720 B1 | 6/2001 | Linger et al. | |
| 6,357,777 B1 | 3/2002 | Linger et al. | |
| 6,386,570 B2 | 5/2002 | Linger et al. | |
| 6,467,791 B1 | 10/2002 | Fandrich et al. | |
| 6,485,045 B1 * | 11/2002 | King | 280/417.1 |
| 6,488,305 B2 * | 12/2002 | Laarman | 280/438.1 |
| 6,502,846 B2 * | 1/2003 | Fandrich et al. | 280/491.5 |
| 6,520,528 B2 | 2/2003 | Fandrich et al. | |
| 6,557,883 B2 | 5/2003 | Linger et al. | |
| 6,682,089 B2 | 1/2004 | McCoy et al. | |
| 6,685,210 B2 * | 2/2004 | Lindenman et al. | 280/441 |
| 6,736,420 B2 * | 5/2004 | Laarman et al. | 280/438.1 |
| 7,100,935 B1 * | 9/2006 | Dunbar | 280/433 |
| 7,108,274 B2 * | 9/2006 | Laarman | 280/438.1 |
| 7,114,740 B1 | 10/2006 | Mann et al. | |
| 7,240,913 B2 | 7/2007 | Kahrs et al. | |
| 7,296,817 B1 | 11/2007 | Mann et al. | |
| 7,490,846 B2 | 2/2009 | Kaun | |
| 7,506,886 B2 | 3/2009 | Warnock | |
| 7,584,982 B2 * | 9/2009 | Fisher | 280/438.1 |
| 7,717,451 B2 * | 5/2010 | Alguera | 280/438.1 |
| 7,753,392 B2 | 7/2010 | Warnock | |
| 7,874,569 B2 * | 1/2011 | Schmidt et al. | 280/438.1 |
| 2002/0121762 A1 * | 9/2002 | Laarman | 280/434 |
| 2003/0034631 A1 * | 2/2003 | Lindenman et al. | 280/438.1 |
| 2006/0202443 A1 * | 9/2006 | Sibley et al. | 280/441 |
| 2007/0007747 A1 * | 1/2007 | Laarman | 280/438.1 |
| 2007/0176395 A1 | 8/2007 | Warnock | |
| 2008/0042397 A1 | 2/2008 | Warnock | |
| 2009/0230655 A1 * | 9/2009 | Schmidt et al. | 280/407 |

* cited by examiner

SLIDING HITCH ASSEMBLY

CROSS-REFERENCES TO RELATED APPLICATIONS

This application claims priority to U.S. Provisional Patent Application Ser. No. 61/249,549, filed Oct. 7, 2009, which is incorporated herein by reference in its entirety for all purposes.

FIELD OF THE DISCLOSURE

The present disclosure relates generally to towing hitch assemblies and, more particularly, to hitch assemblies having a hitch that is longitudinally movable relative to the towing vehicle.

BACKGROUND OF THE DISCLOSURE

Examples of towing hitch assemblies are disclosed in U.S. Pat. Nos. 5,044,651; 5,707,070; 5,772,229; 5,839,745; 6,247,720; 6,357,777; 6,386,570; 6,557,883; 6,682,089 and 6,685,210; U.S. Design Pat. Nos. USD380719 and USD395025; and Canadian Patent Application No. CA2576427. The disclosures of these and all other publications referenced herein are incorporated by reference in their entirety for all purposes.

Sliding hitch assemblies may include a fifth wheel that is longitudinally movable relative to the towing vehicle. Such longitudinal movement of the fifth wheel assembly allows the fifth wheel, and correspondingly a trailer kingpin received by the fifth wheel, to be suitably positioned relative to the towing vehicle. For example, the fifth wheel may be located above the towing vehicle's rear axle for normal towing. However, the fifth wheel may be selectively displaced toward the rear end of the towing vehicle to allow for increased clearance between the towing vehicle and trailer, which offers greater maneuverability such that the towing vehicle and trailer may perform a tighter turn due to the increased clearance.

SUMMARY OF THE DISCLOSURE

Examples of sliding hitch assemblies, and locking mechanisms therefor are disclosed.

DETAILED DESCRIPTION OF THE DISCLOSURE

Figure 1:
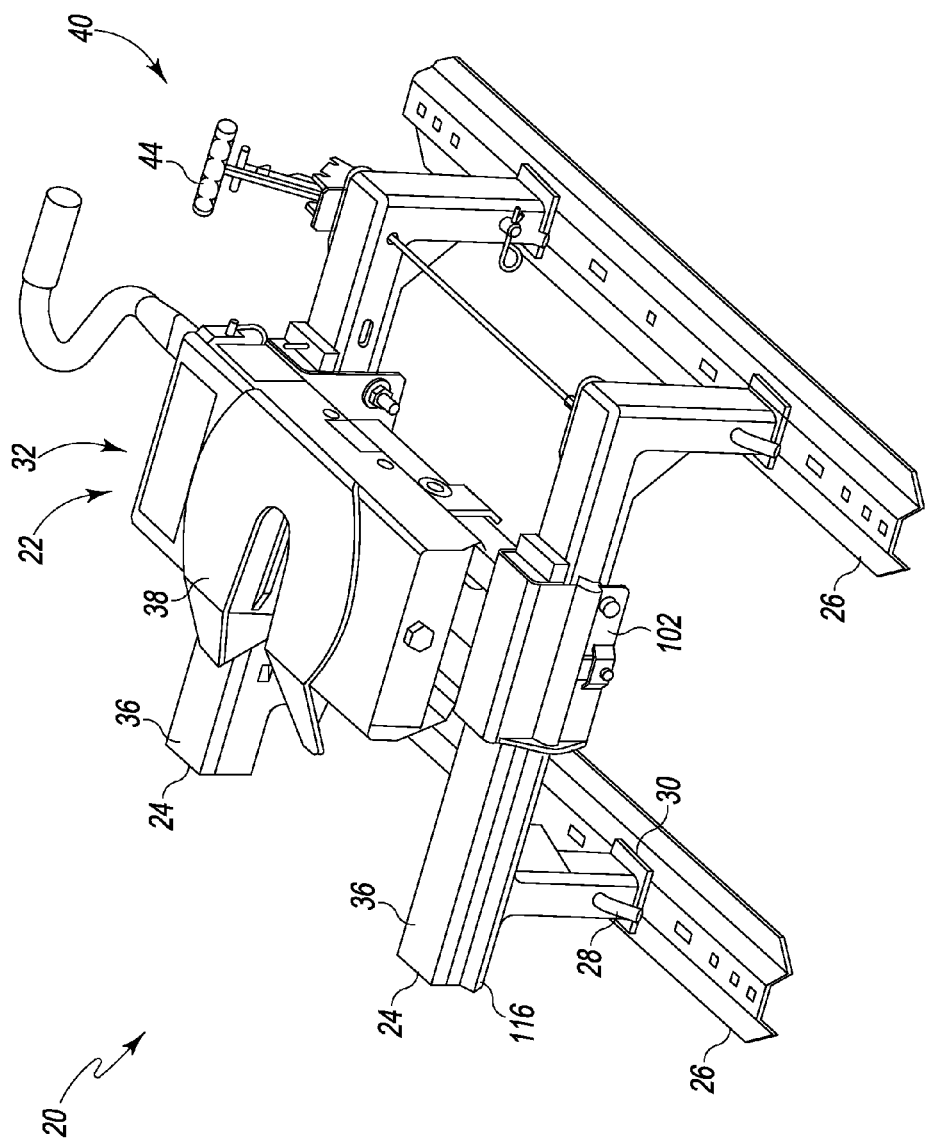
FIG. 1 is a perspective view of a nonexclusive illustrative example of a sliding hitch assembly, shown with the position selecting lever configured to select the driving position and the fifth wheel assembly in the driving position.

A nonexclusive illustrative example of a sliding hitch assembly is shown generally at 20 in FIGS. 1-24. Unless otherwise specified, sliding hitch assembly 20 may, but is not required to, contain at least one of the structures, components, functionalities, concepts, and/or variations described, illustrated, and/or incorporated herein. The sliding hitch assembly 20 may include a movable fifth wheel assembly 22 and a pair of elevated slide rails 24 that are mounted to a pair of mounting or bed rails 26. The bed rails 26 may be secured to an appropriate surface of a towing vehicle (not shown), such as the floor of a truck bed. A kingpin of a trailer or towed vehicle (not shown) may be engaged by the fifth wheel assembly in a conventional manner.

In some examples, the slide rails 24 may be secured, such as with pins 28, to base posts 30 that are bolted, or otherwise attached, to the bed rails 26. Either or both of the slide rails 24 and the base posts 30 may include a plurality of holes for the pins 28 such that the height of the fifth wheel assembly 22 may be adjusted. The height adjustment, shown in dashed lines in FIG. 8, may allow several inches of height adjustment for the fifth wheel assembly. For example, the height of the fifth wheel assembly may be adjusted such that an upper surface of the fifth wheel assembly may be positioned between 16.8 and 18.8 inches, or any other suitable distance, above the towing vehicle surface to which the bed rails are mounted.

Figure 2:
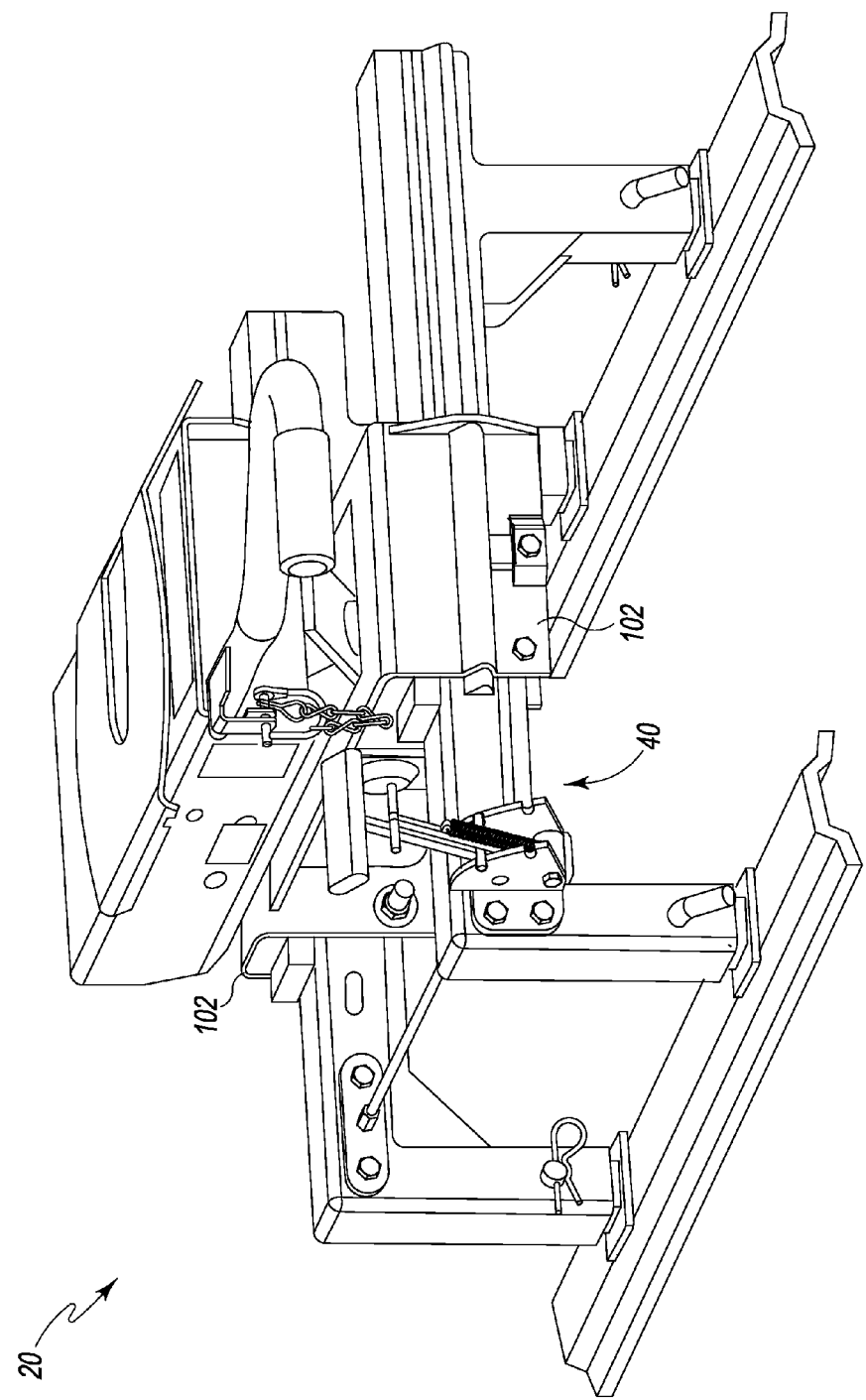
FIG. 2 is another perspective view of the sliding hitch assembly of FIG. 1.
Figure 3:
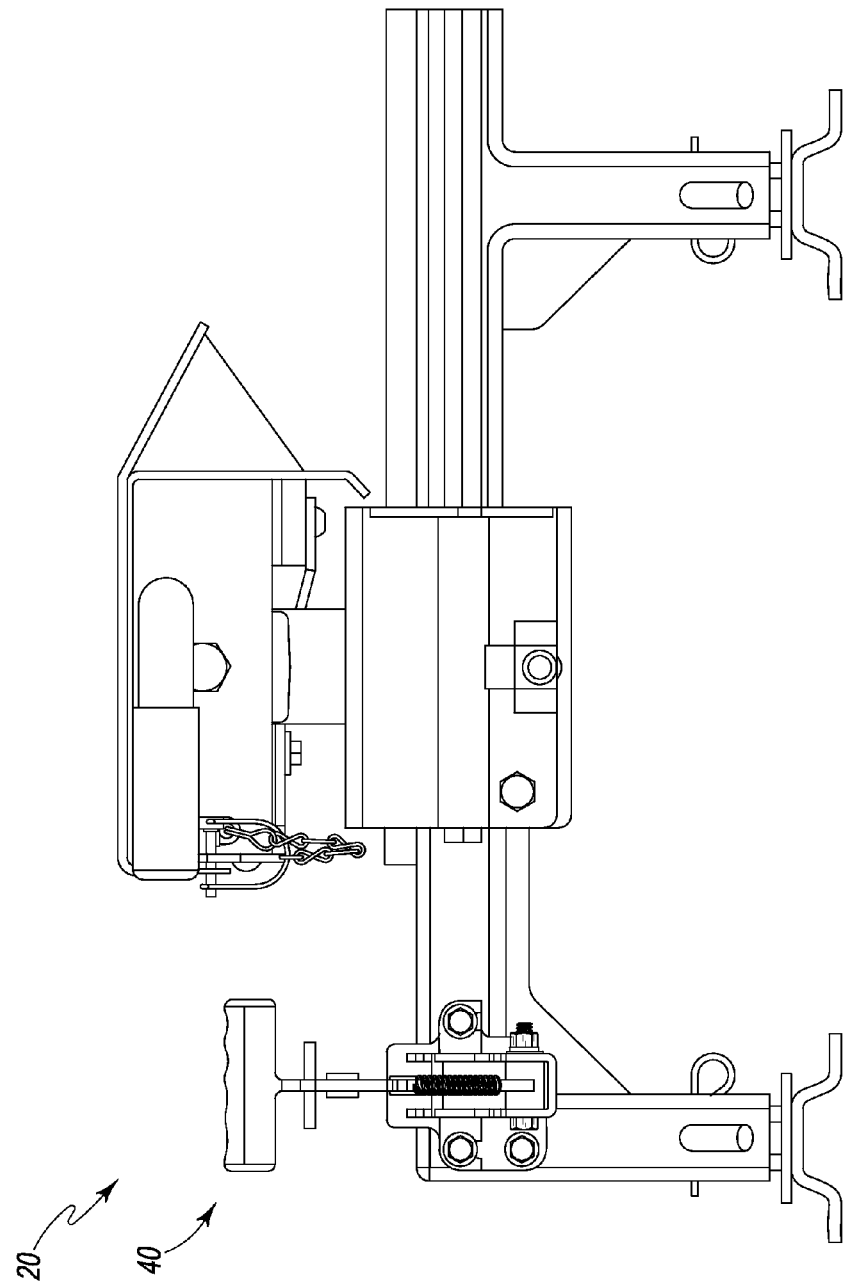
FIG. 3 is a driver-side view of the sliding hitch assembly of FIG. 1.
Figure 4:
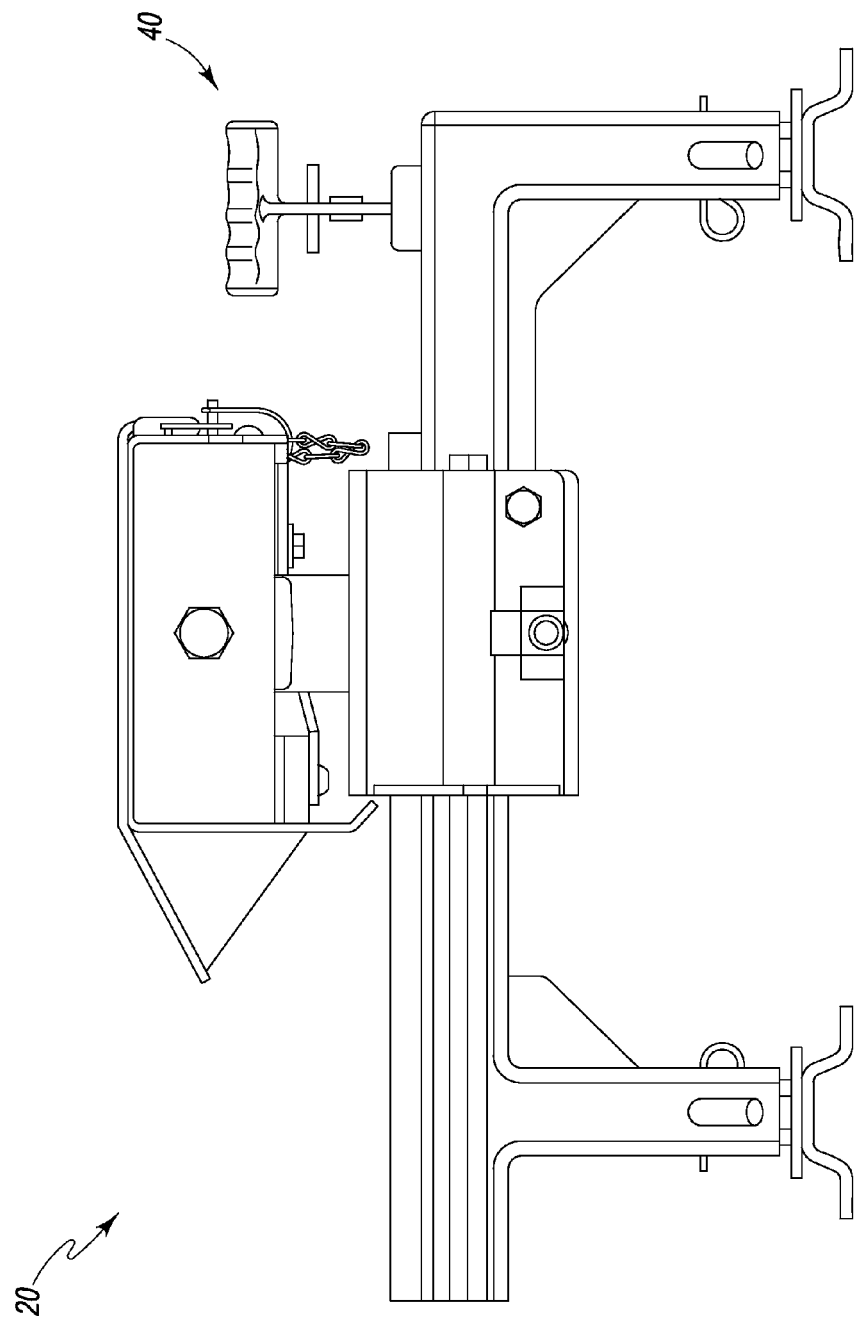
FIG. 4 is a passenger-side view of the sliding hitch assembly of FIG. 1.
Figure 5:
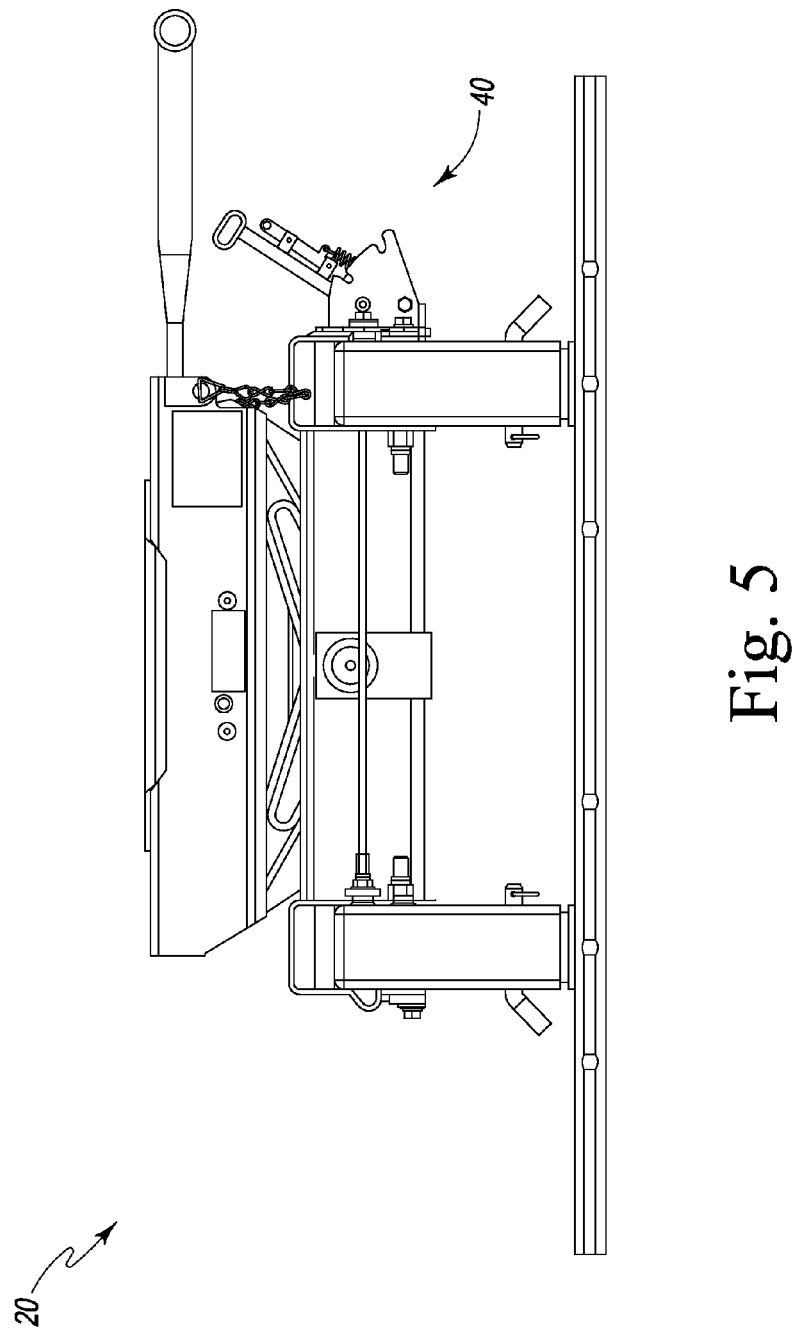
FIG. 5 is a towing vehicle-front view of the sliding hitch assembly of FIG. 1.
Figure 6:
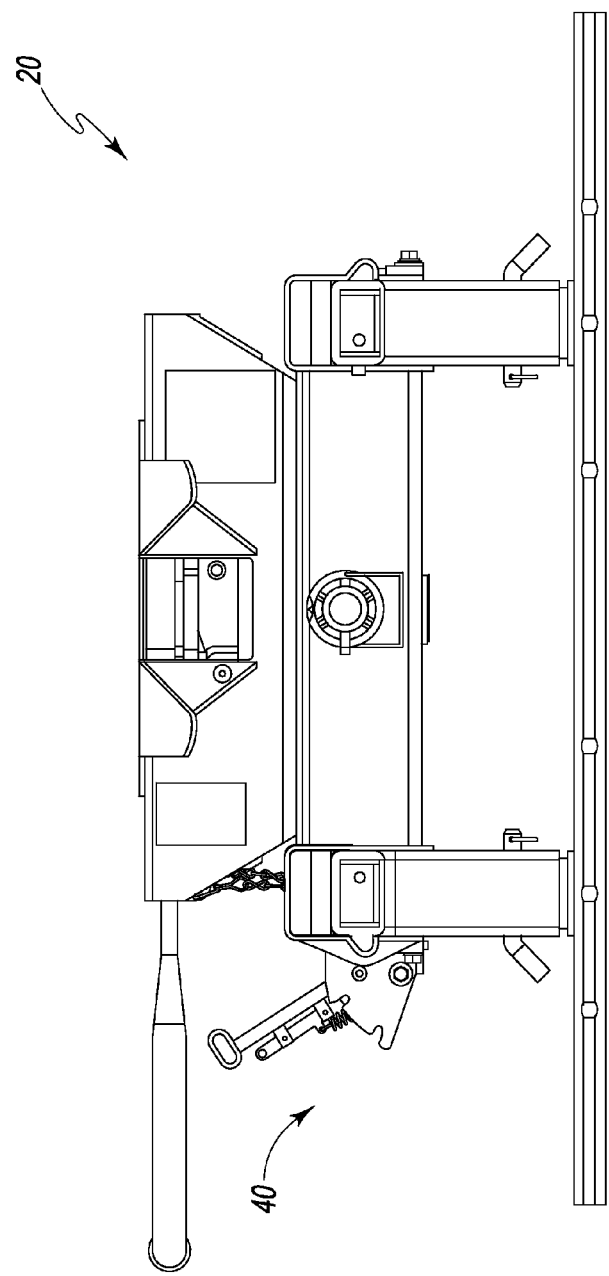
FIG. 6 is a towing vehicle-rear view of the sliding hitch assembly of FIG. 1.
Figure 7:
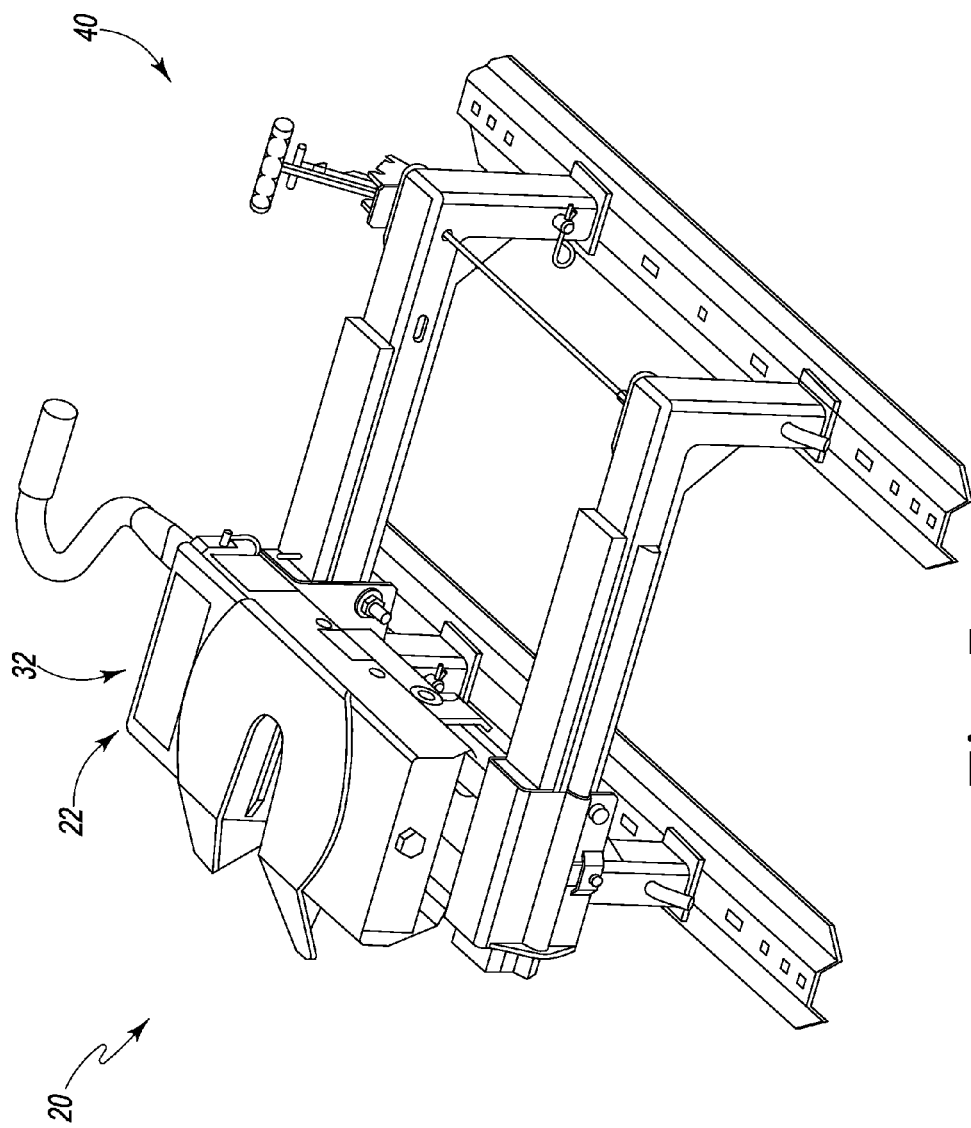
FIG. 7 is another perspective view of the sliding hitch assembly of FIG. 1, shown with the position selecting lever configured to select the driving position, but with the fifth wheel assembly in the maneuvering position.
Figure 8:
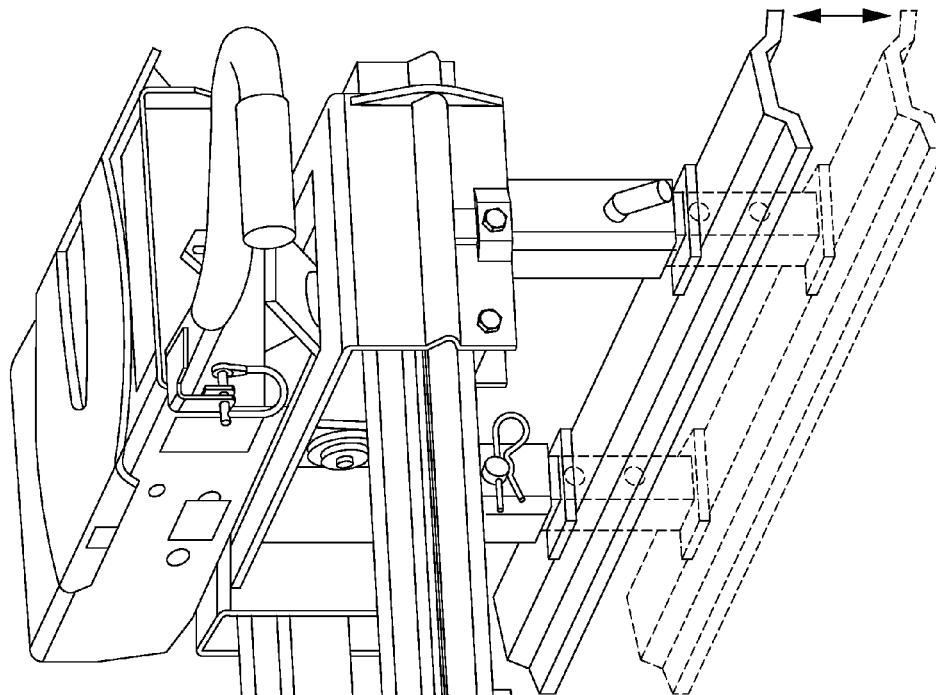
FIG. 8 is another perspective view of the sliding hitch assembly of FIG. 1, shown with the position selecting lever configured to select the driving position, but with the fifth wheel assembly in the maneuvering position, as in FIG. 7.

The fifth wheel assembly 22 may be moved or slid along the slide rails 24 between a first or driving position 32, as shown in FIGS. 1 and 2, and a second or maneuvering position 34, as shown in FIGS. 7 and 8. When in the driving position, the fifth wheel assembly 22 may be positioned generally above a rear axle of the towing vehicle. When in the maneuvering position, the fifth wheel assembly 22 may be moved or displaced rearward, relative to the towing vehicle, from the driving position, which may provide for improved clearance between the towing and the front of a towed vehicle. As used in connection with the examples presented herein, the directions forward, rearward, driver's side, and passenger side refer to, and are relative to, a conventional left-hand drive towing vehicle.

The fifth wheel assembly 22 may rest on, or be supported by, sliding surfaces 36 disposed on the upper part of the elevated slide rails 24, as shown in FIG. 1. When the fifth wheel assembly 22 moves between the driving position and the maneuvering position, the fifth wheel assembly 22 may roll, slide or otherwise move along the sliding surfaces 36.

As may be appreciated from FIGS. 1-8, the sliding surfaces 36, being on the upper part of the elevated slide rails 24, are relatively close, vertically, to the jaws 38 of the fifth wheel assembly 22. Such a configuration may limit or reduce any torque or bending loads between the fifth wheel assembly 22 and the bed rails 26 that must be carried, transmitted or otherwise supported by the sliding surfaces. Furthermore, vertically spacing the sliding surfaces 36 above the surface of the towing vehicle to which the bed rails are secured may provide and/or improve clearance between the movable fifth wheel assembly 22, including its various components, and obstructions that may be present on the towing vehicle, such as the wheel wells.

The sliding hitch assembly 20 may further include a locking mechanism 40, which may be configured to selectively lock and/or retain the fifth wheel assembly 22 in one or both of the driving and maneuvering positions. The various components and functions of the locking mechanism will be discussed in connection with FIGS. 9-23. The locking mechanism 40 may include a position selecting lever 44, a lever lock 46, first and second actuating cables 50, 52, first and second cam members 56, 58, first and second driving position locking pins 62, 64, and first and second maneuvering position locking pins 68, 70.

As will be more fully discussed below, the driving position locking pins 62, 64 and the maneuvering position locking pins 68, 70 may be biased, such as with a spring, to their respective extended or locked positions. However, it should be understood that the driving position locking pins 62, 64 and the maneuvering position locking pins 68, 70 may be biased, such as with a spring, to their respective retracted or unlocked positions. In such an example, the movements and functions of the various components of the locking mechanism would be altered accordingly.

The position selecting lever 44 may be disposed on or proximate one of the slide rails 24. As shown in FIG. 1, the position selecting lever 44 may be disposed proximate a forward end of the driver-side slide rail. Disposing the position selecting lever 44 on one of the slide rails may substantially fix the location of the position selecting lever 44 relative to the towing vehicle, which may allow locating the position selecting lever 44 in a convenient location for use or actuation of the lever without having to address clearance issues that may be associated with the moving components of a sliding hitch assembly, such as the fifth wheel assembly. For example, the position selecting lever 44 may be located on a sliding hitch assembly, including those where the sliding surfaces are not elevated, without needing to consider whether the position selecting lever would be able to clear a wheel well when the fifth wheel assembly is moved between the driving position and the maneuvering position because the position selecting lever does not move with the fifth wheel assembly.

Figure 9:
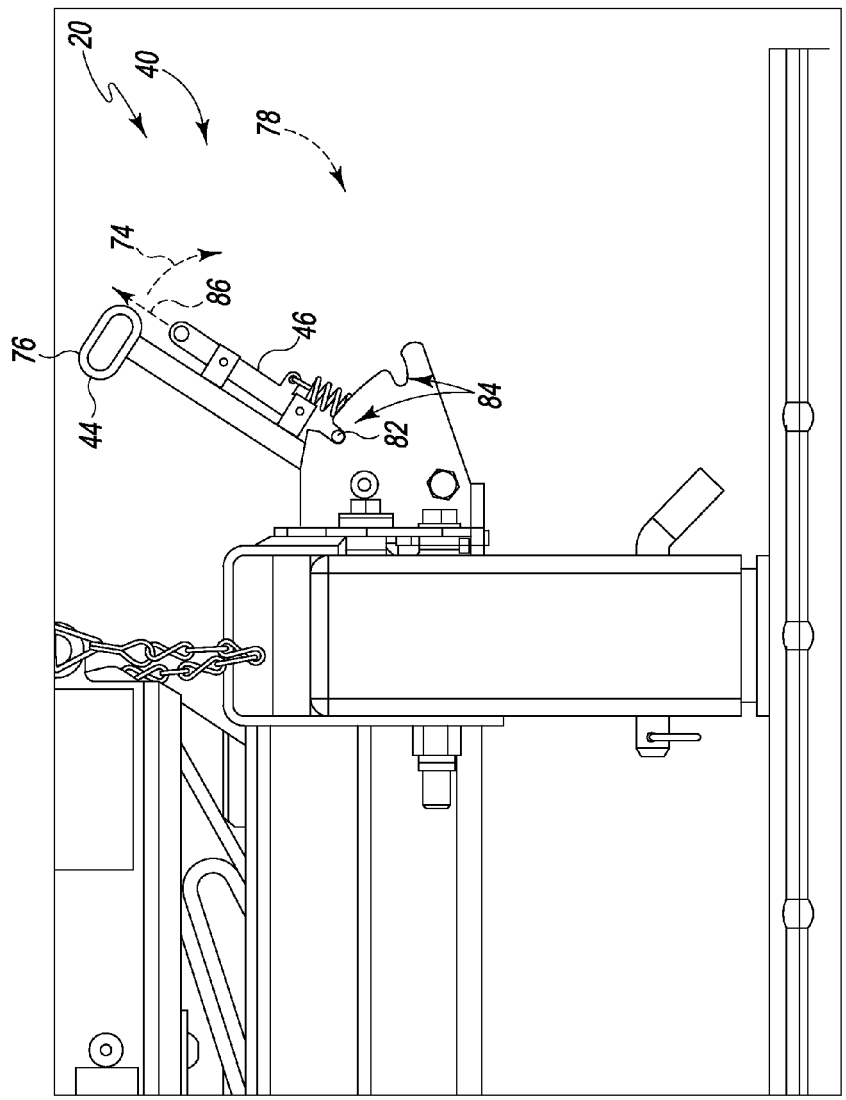
FIG. 9 shows the position selecting lever of the sliding hitch assembly of FIG. 1 configured to select the driving position.

As suggested in FIG. 9, the position selecting lever 44 may be moved or pivoted, as suggested by the arrow 74, from a first position 76 (shown) to a second position 78. In the first position 76, the position selecting lever 44 may configure the locking mechanism into a driving configuration in which it is configured to retain the fifth wheel assembly in the driving position. In the second position 78, the position selecting lever 44 may configure the locking mechanism into a maneuvering configuration in which it is configured to retain the fifth wheel assembly in the maneuvering position.

Figure 10:
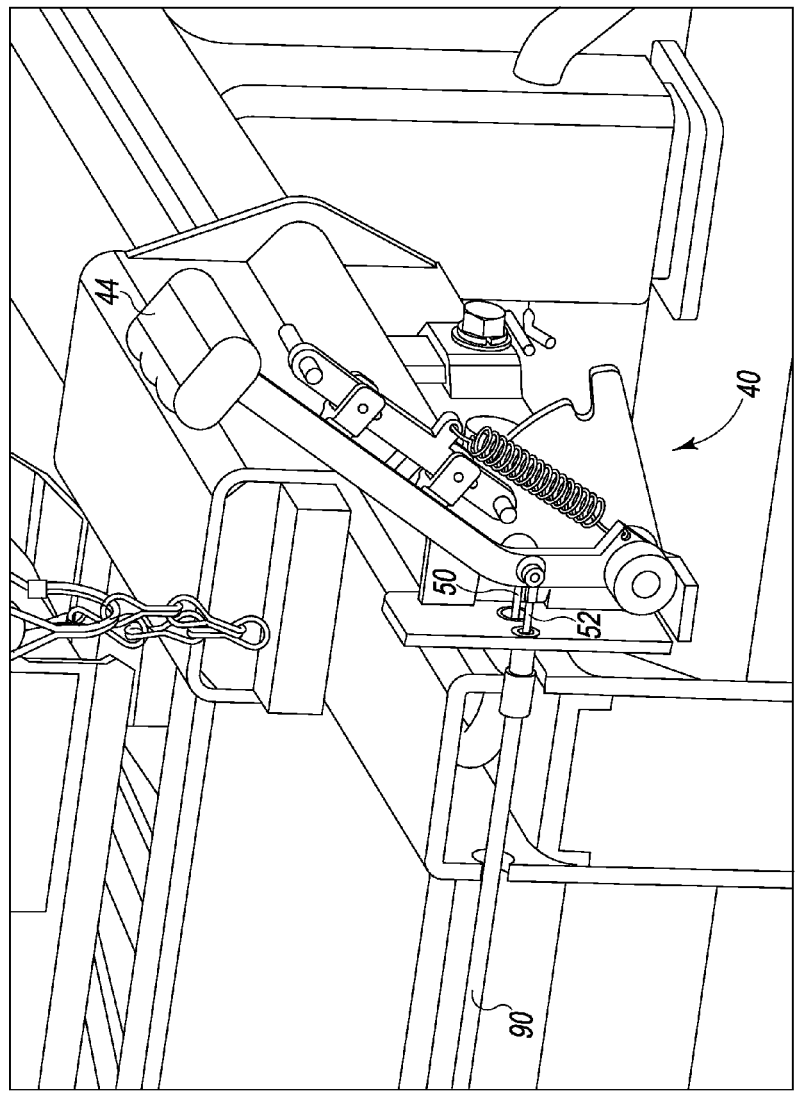
FIG. 10 is a partially broken away view showing the actuating-cable attachments to the position selecting lever.

The position selecting lever 44 may be biased toward one of the first and second positions and/or it may be may be mechanically retained in one or both of the first and second positions. For example, the lever lock 46 may be configured to retain the position selecting lever 44 in a selected one of the first and second positions. In particular, as shown in FIGS. 9 and 10, the lever lock 46 may include a lock pin 82 that is configured to engage one of a pair of notches or detents 84 to selectively retain the position selecting lever 44 in the one of the first and second positions corresponding to the particular detent engaged by the lock pin. The position selecting lever 44 may be unlocked for movement between the first and second positions by pulling the lever lock 46, as suggested by arrow 86 in FIG. 9, to disengage the lock pin 82 from one of the detents 84. As shown in FIG. 10, the lever lock 46 may be biased, such as by a tension spring, towards its locking position.

Figure 11:
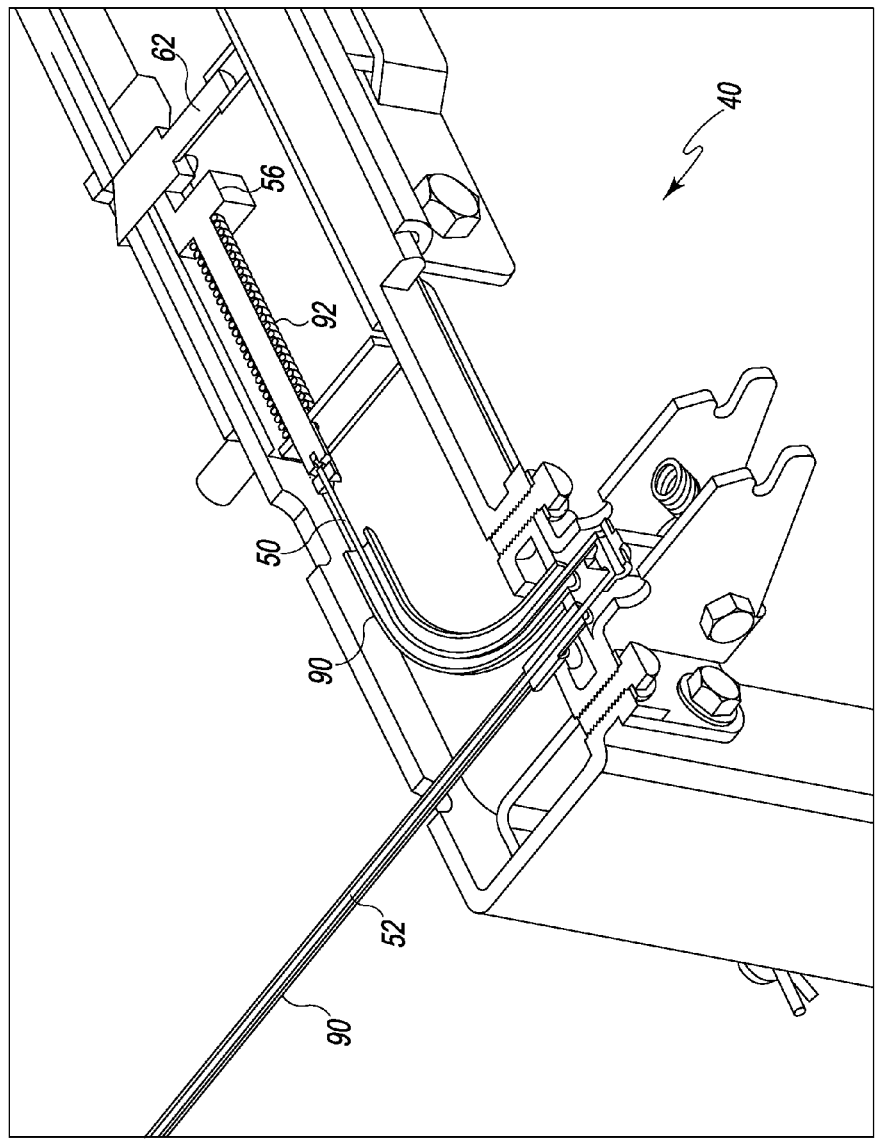
FIG. 11 is a section view taken on the plane of the actuating cables and showing a portion, on the driver's side, of the locking mechanism for the fifth wheel assembly of the sliding hitch assembly of FIG. 1.

The first and second actuating cables 50, 52 may be attached to the position selecting lever 44 as shown in FIGS. 10 and 11. Portions of one of more of the actuating cables may be encased in a cable housing 90, such as where the cable is exposed, routed externally to one or more of the components of the sliding hitch assembly, and/or where the direction of the cable changes. As shown in FIGS. 9 and 10, moving the position selecting lever 44 from the first position 76 toward the second position 78 pulls the actuating cables 50, 52 and/or induces a tensile load into the cables.

The routing of the actuating cables may be selected to reduce or avoid damage to the cables. For example, as shown and suggested in FIG. 1, the actuating cables may be routed within various components of the hitch assembly and/or within an envelope generally defined by the various components of the hitch assembly.

As generally shown in FIGS. 9-15, the locking mechanism 40 may be configured into the driving configuration in which the locking mechanism retains the fifth wheel assembly in the driving position. Although FIGS. 9-15 generally illustrate the function of the first actuating cable 50, the first cam member 56, the first driving position locking pin 62, and the first maneuvering position locking pin 68, it should be understood that the second actuating cable 52, the second cam member 58, the second driving position locking pin 64, and the second maneuvering position locking pin 70 function in a similar manner.

Figure 12:
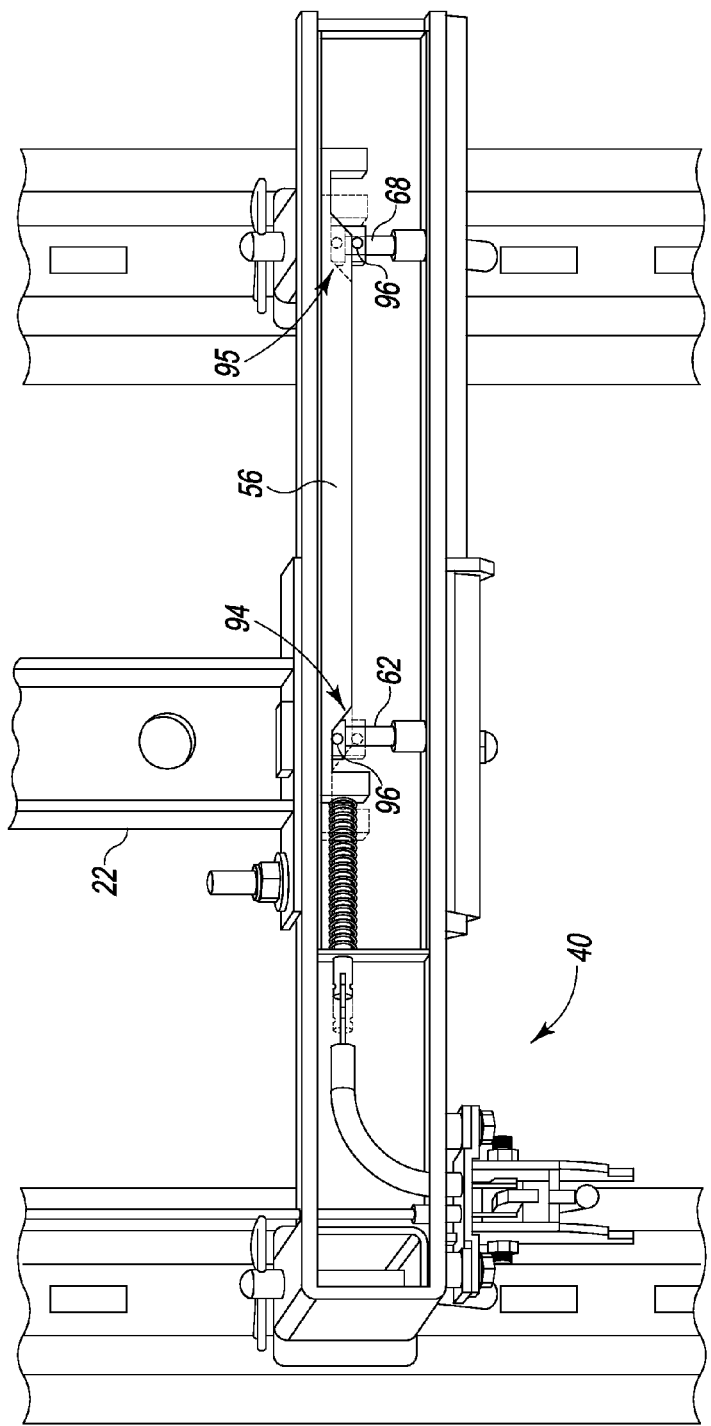
FIG. 12 is a section view showing a portion of the locking mechanism, with the locking mechanism configured to retain the fifth wheel assembly in the driving position, and with the fifth wheel assembly locked in the driving position.

As shown in FIGS. 9, 11 and 12, when the position selecting lever 44 is in the first position 76, the actuating cables 50, 52 are at least partially relaxed, or relieved from tension, and a spring 92 urges the first cam member 56 toward its driving configuration position. The spring 92, acting through the actuating cable 50, may at least partially bias the selecting lever 44 toward the first position 76 when the spring 92 urges the first cam member 56 toward its driving configuration position.

Figure 13:
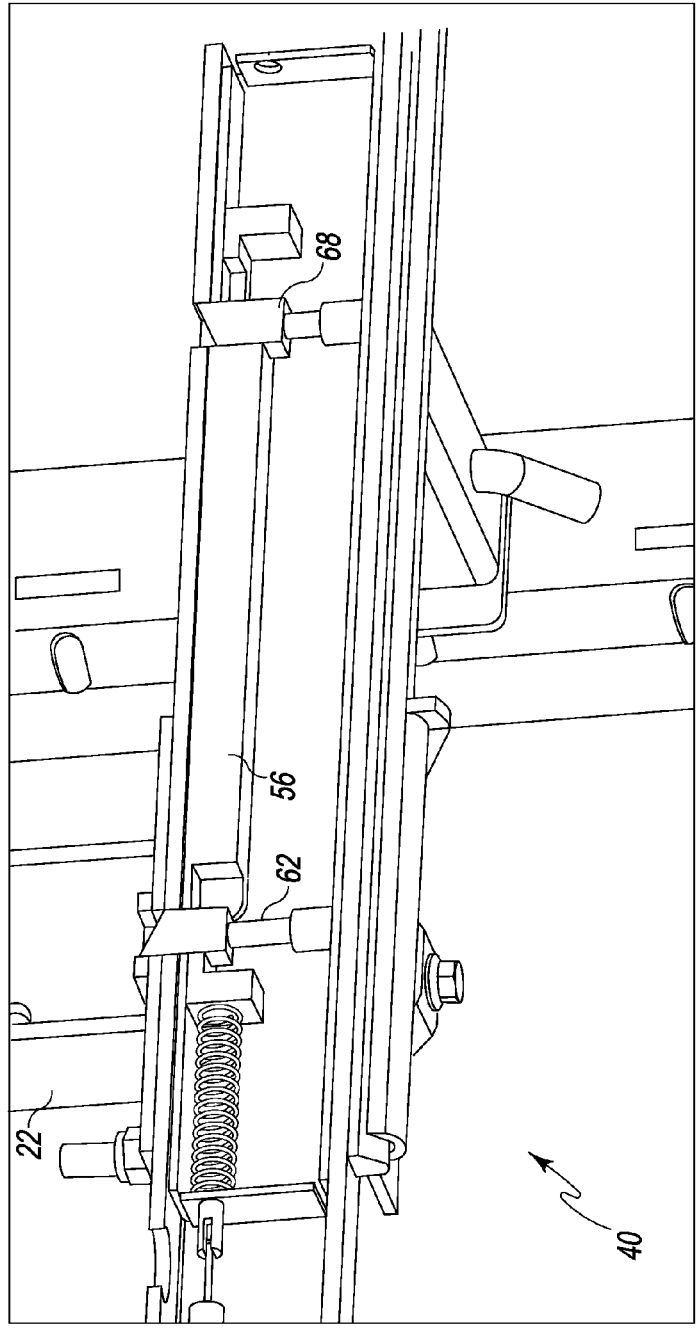
FIG. 13 is another section view showing a portion of the locking mechanism, with the locking mechanism configured to retain the fifth wheel assembly in the driving position, and with the fifth wheel assembly locked in the driving position.
Figure 14:
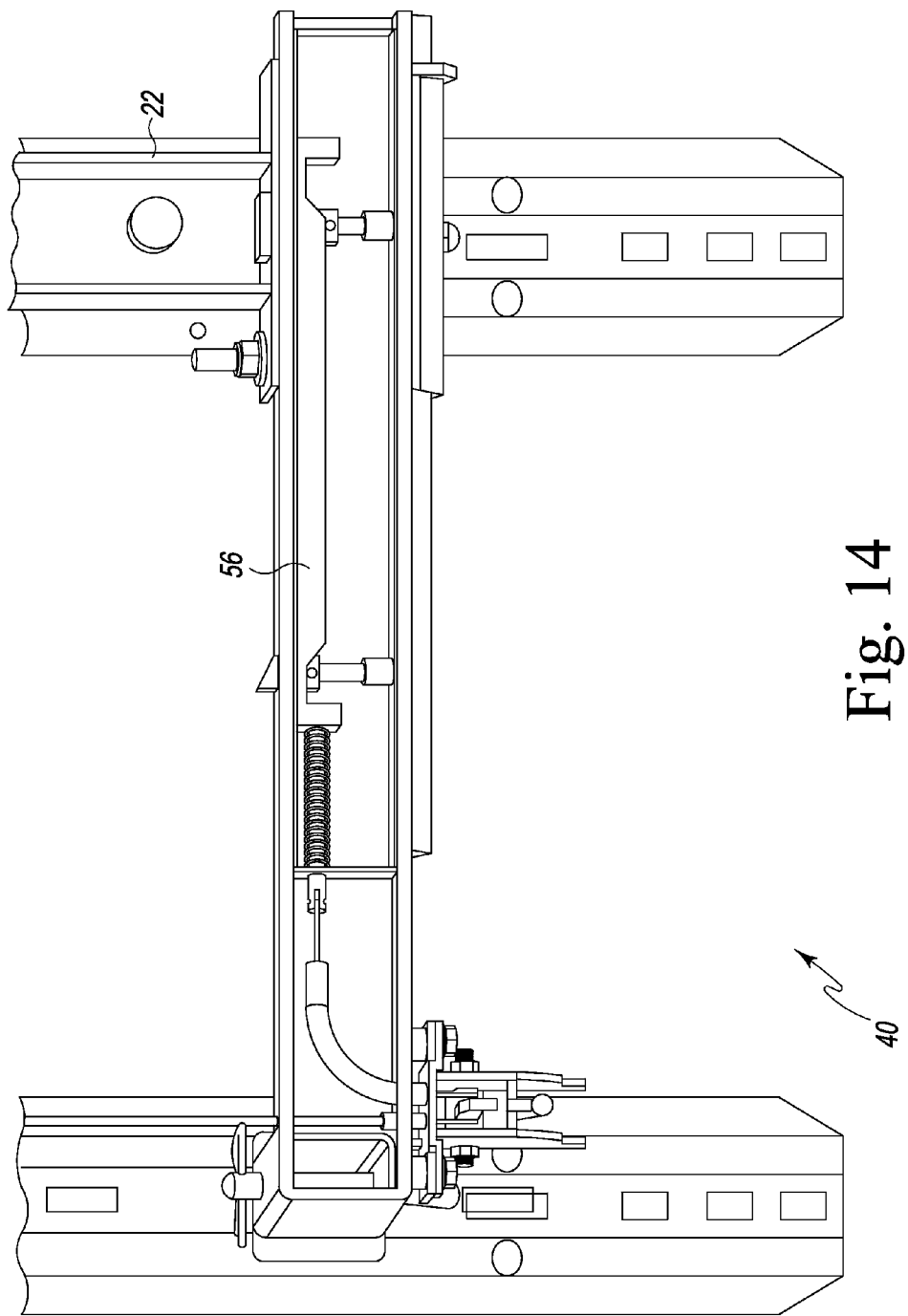
FIG. 14 is a section view showing a portion of the locking mechanism, with the locking mechanism configured to retain the fifth wheel assembly in the driving position, but with the fifth wheel assembly in the maneuvering position.
Figure 15:
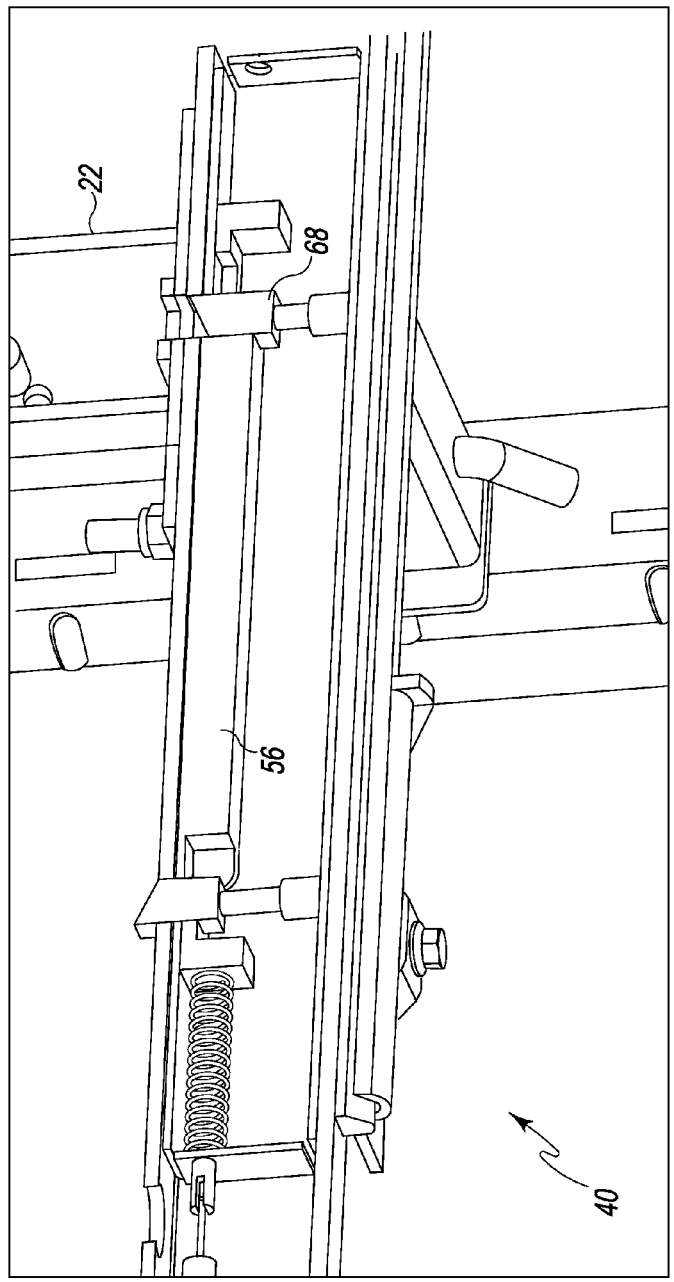
FIG. 15 is another section view showing a portion of the locking mechanism, with the locking mechanism configured to retain the fifth wheel assembly in the driving position, but with the fifth wheel assembly in the maneuvering position.

As shown in FIG. 12, cam surfaces 94 on the cam member 56 engage posts 96 on the first driving position locking pin 62 and the first maneuvering position locking pin 68. When the cam member 56 is in its driving configuration position, as shown in FIGS. 11-15, one of the cam surfaces engages the posts on the first maneuvering position locking pin 68 and urges the first maneuvering position locking pin 68, against its bias, to its unlocked position, as shown in FIGS. 12 and 13, while the other one of the cam surfaces allows the first driving position locking pin 62 to move, under its bias, toward its locked position. Thus, when the fifth wheel assembly 22 is in the driving position, and the locking mechanism 40 is in the driving configuration, as shown in FIGS. 11-14, the first driving position locking pin 62 engages the fifth wheel assembly 22, as shown in FIG. 13, and locks the fifth wheel assembly in the driving position. However, when the fifth wheel assembly 22 is in the maneuvering position, and the locking mechanism 40 is placed in the driving configuration, as shown in FIGS. 14 and 15, the first maneuvering position locking pin 68 would disengage the fifth wheel assembly 22, as shown in FIG. 15, such that the fifth wheel assembly may be moved toward the driving position, where it would be locked, as shown in FIG. 13. As may be understood from FIGS. 15 and 13, the fifth wheel assembly 22 would engage the ramped face of the driving position locking pin 62 and urge that locking pin out of the way, against the pin's bias, until the fifth wheel assembly reaches the driving position, where the driving position locking pin 62 may move into engagement with the fifth wheel assembly 22, as shown in FIG. 13.

As generally shown in FIGS. 16-19, the locking mechanism 40 may be configured into the maneuvering configuration in which the locking mechanism retains the fifth wheel assembly in the maneuvering position. Although FIGS. 16-19 generally illustrate the function of the second actuating cable 52, the second cam member 58, the second driving position locking pin 64, and the second maneuvering position locking pin 70, it should be understood that the first actuating cable 50, the first cam member 56, the first driving position locking pin 62, and the first maneuvering position locking pin 68 function in a similar manner.

Figure 16:
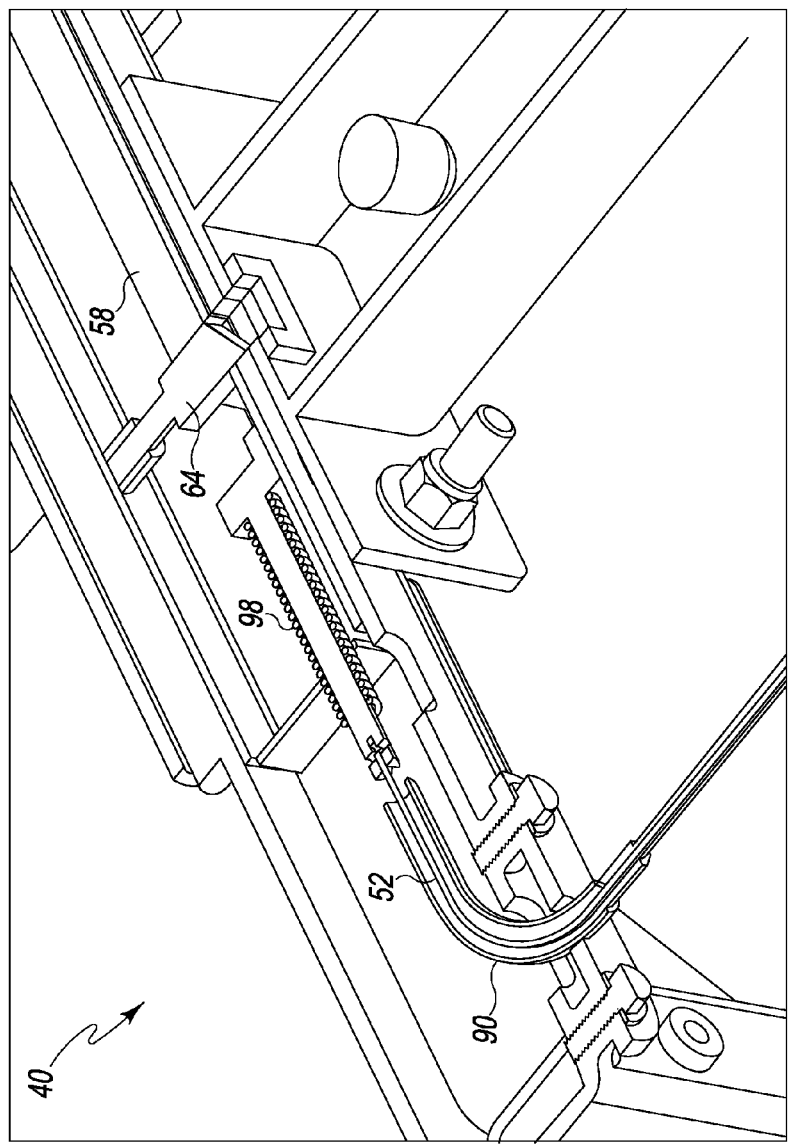
FIG. 16 is a section view taken on the plane of the actuating cables and showing a portion, on the passenger side, of the locking mechanism for the fifth wheel assembly of the sliding hitch assembly of FIG. 1.
Figure 17:
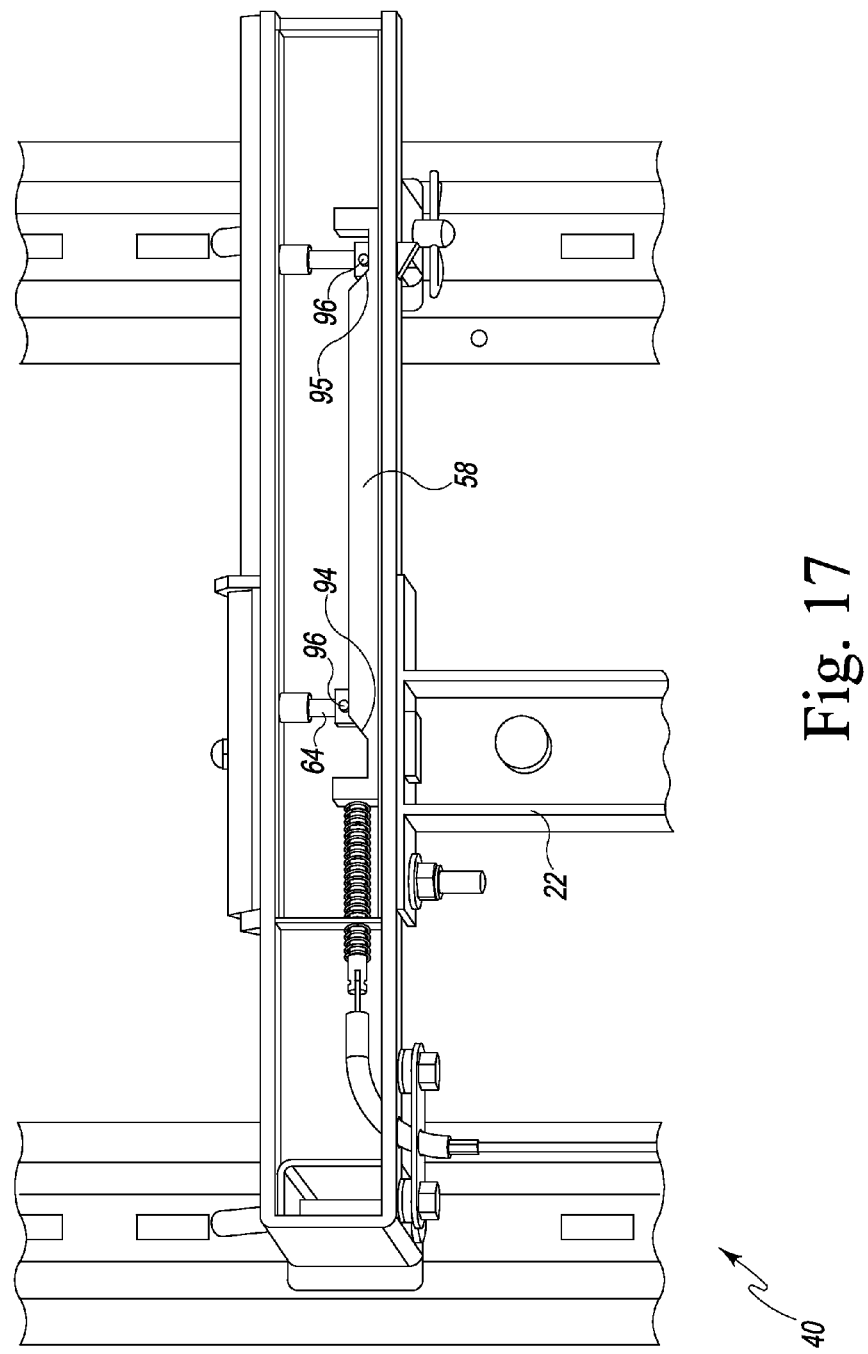
FIG. 17 is a section view showing a portion of the locking mechanism, with the locking mechanism configured to retain the fifth wheel assembly in the maneuvering position, but with the fifth wheel assembly in the driving position.
Figure 18:
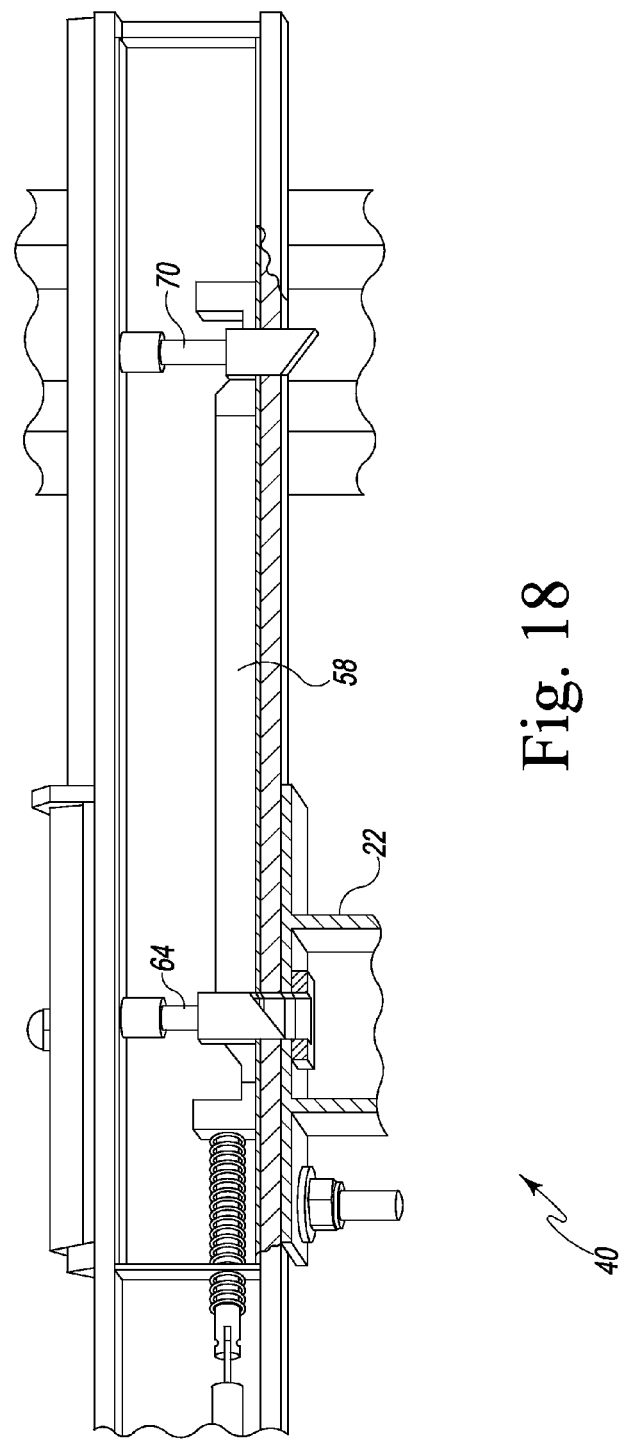
FIG. 18 is another section view showing a portion of the locking mechanism, with the locking mechanism configured to retain the fifth wheel assembly in the maneuvering position, but with the fifth wheel assembly in the driving position.
Figure 19:
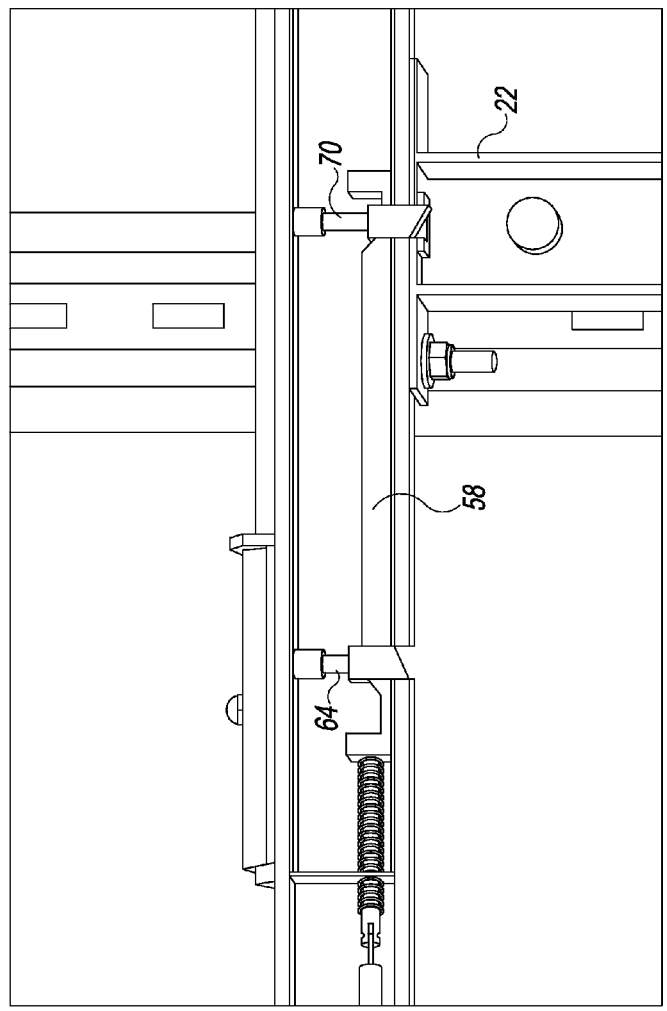
FIG. 19 is a section view showing a portion of the locking mechanism, with the locking mechanism configured to retain the fifth wheel assembly in the maneuvering position, and with the fifth wheel assembly locked in the maneuvering position.

As shown in FIGS. 16 and 17 and suggested by FIGS. 9 and 10, when the position selecting lever 44 is in the second position 78, the actuating cables 50, 52 are under tension and move the second cam member 58, against the bias of a spring 98, toward the second cam member's maneuvering configuration position. As shown in FIG. 17, cam surfaces 94 on the cam member 58 engage posts 96 on the second driving position locking pin 64 and the second maneuvering position locking pin 70. When the cam member 58 is in its maneuvering configuration position, as shown in FIGS. 16-19, one of the cam surfaces engages the posts on the second driving position locking pin 64 and urges the second driving position locking pin 64, against its bias, to its unlocked position, as shown in FIGS. 17-19, while the other one of the cam surfaces allows the second maneuvering position locking pin 70 to move, under its bias, to its locked position. Thus, when the fifth wheel assembly 22 is in the maneuvering position, and the locking mechanism 40 is in the maneuvering configuration, as shown in FIG. 19, the second maneuvering position locking pin 70 engages the fifth wheel assembly 22 and locks the fifth wheel assembly in the maneuvering position. However, when the fifth wheel assembly 22 is in the driving position, and the locking mechanism 40 is placed in the maneuvering configuration, as shown in FIGS. 17 and 18, the second driving position locking pin 64 would disengage the fifth wheel assembly 22, as shown in FIG. 18, such that the fifth wheel assembly may be moved toward the maneuvering position, where it would be locked, as shown in FIG. 19. As may be understood from FIGS. 18 and 19, the fifth wheel assembly 22 would engage the ramped face of the maneuvering position locking pin 70 and urge that locking pin out of the way, against the pin's bias, until the fifth wheel assembly reaches the maneuvering position where the maneuvering position locking pin 70 may move into engagement with the fifth wheel assembly 22, as shown in FIG. 19.

The sliding hitch assembly 20 may be configured to impede or prevent forward movement of the fifth wheel assembly 22 beyond the driving position and/or rearward movement of the fifth wheel assembly 22 beyond the maneuvering position. For example, as shown in FIGS. 1, 2 and 20-24, the fifth wheel assembly 22 may include a pair of inverted U-shaped members 102 that engage the slide rails 24. A bolt 104 may extend through each of the U-shaped members 102, passing under the slide rails 24, as shown in FIGS. 20-23.

Figure 22:
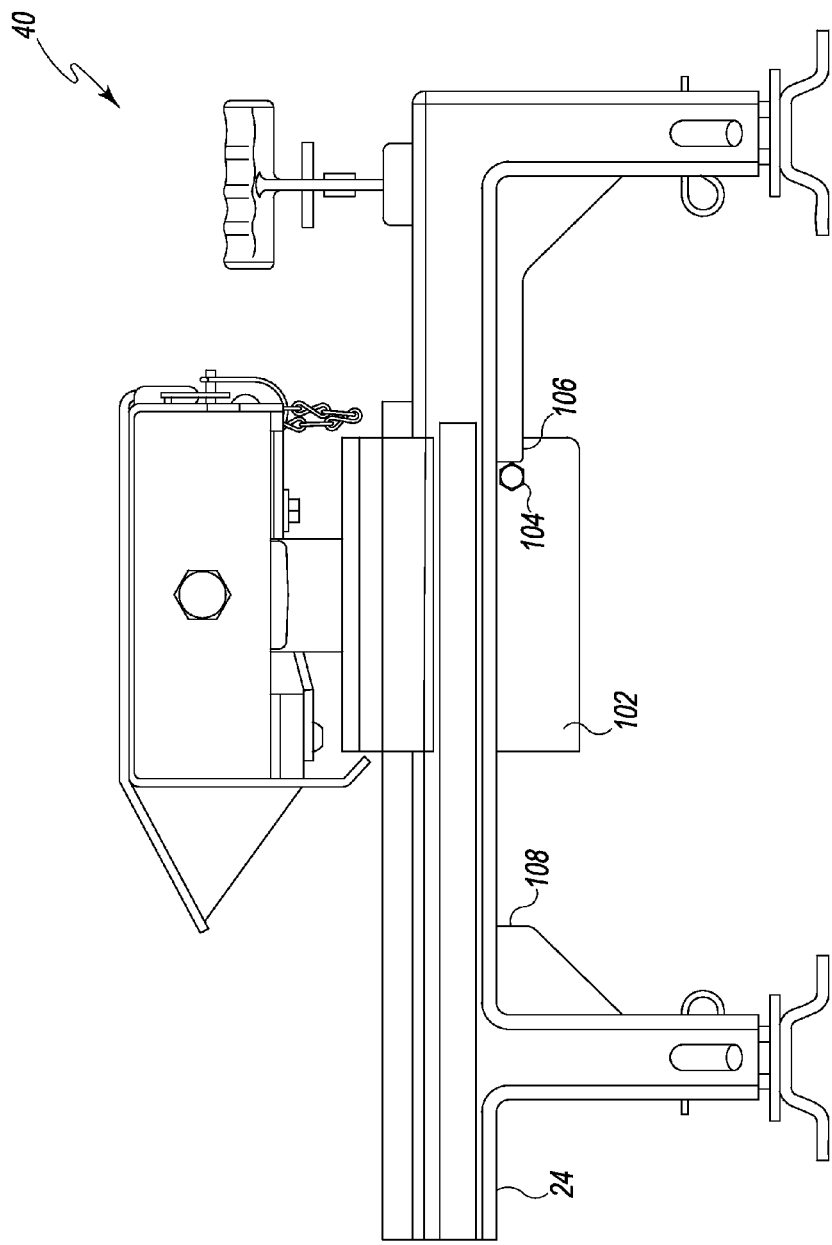
FIG. 22 is a partially broken away view of the sliding hitch assembly of FIG. 1 with the fifth wheel assembly in the driving position and showing the bolt engaged with the driving-position stop on the slide rail.

When the fifth wheel assembly 22 is in the driving position, as shown in FIG. 22, the bolt 104 may engage a driving-position stop 106 on the slide rails 24 to prevent further forward movement, beyond the driving position, of the fifth wheel assembly 22. In addition, and as may be recognized from FIG. 22, pushing loads on the fifth wheel assembly 22, while in the driving position, which would occur when the towing vehicle backs up and pushes the trailer, may be supported by the bolt 104 acting against the driving-position stop 106.

Figure 23:
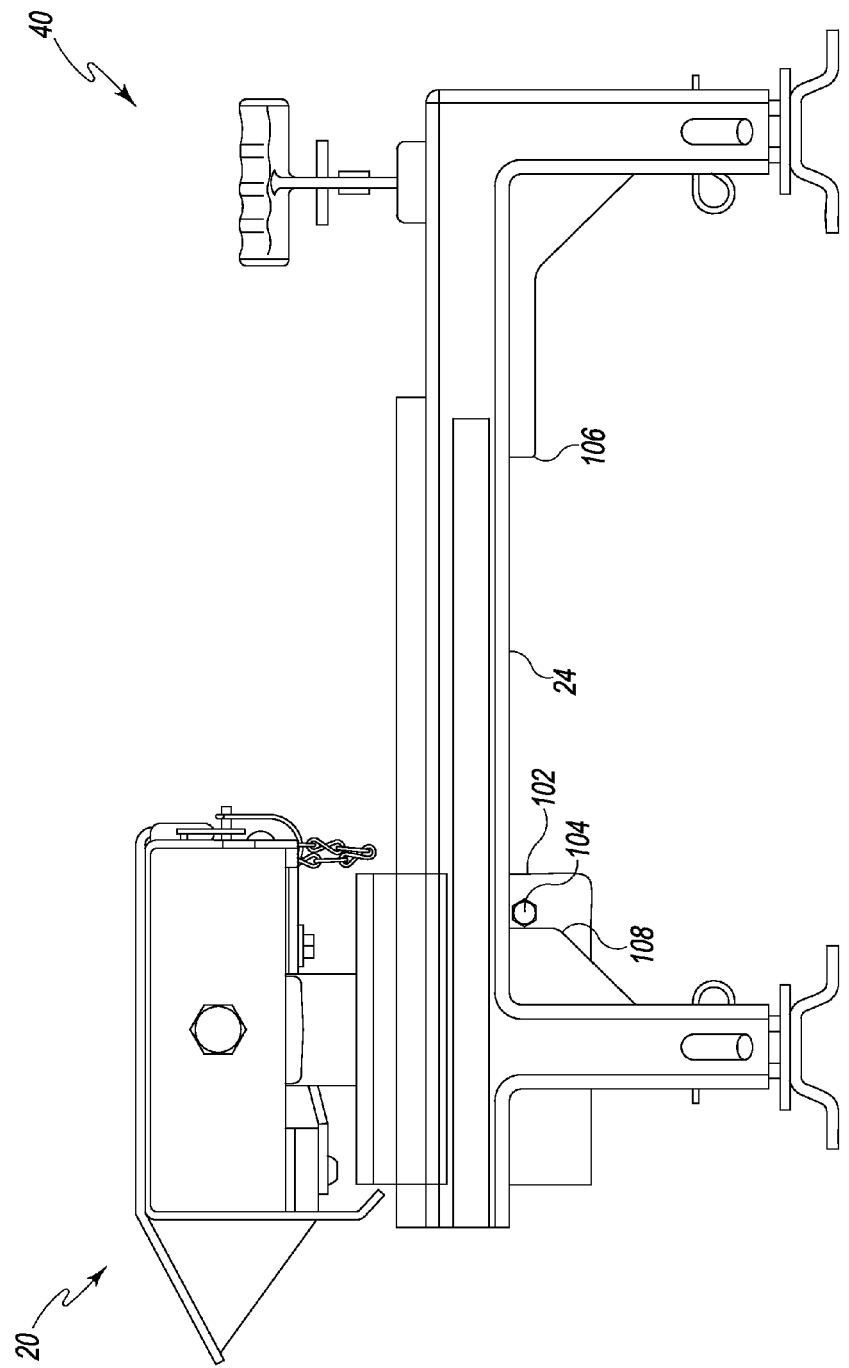
FIG. 23 is a partially broken away view of the sliding hitch assembly of FIG. 1 with the fifth wheel assembly in the maneuvering position and showing the bolt engaged with the maneuvering position stop on the slide rail.

When the fifth wheel assembly 22 is in the maneuvering position, as shown in FIG. 23, the bolt 104 may engage a maneuvering-position stop 108 on the slide rails 24 to prevent further rearward movement, beyond the maneuvering position, of the fifth wheel assembly 22. In addition, and as may be recognized from FIG. 23, pulling loads on the fifth wheel assembly 22, while in the maneuvering position, which would occur when the towing vehicle pulls the trailer forward, may be supported by the bolt 104 acting against the maneuvering-position stop 108.

As discussed above and shown in FIG. 1, the fifth wheel assembly 22 is supported on the sliding surfaces 36 on the elevated slide rails 24. The engagement between fifth wheel assembly 22 and elevated slide rails 24 is shown in more detail in FIGS. 20, 21 and 24. The fifth wheel assembly 22 may include a pair of slider blocks 112, and more specifically wear blocks 112 that rest on, and may slide along, the sliding surfaces 36 of the elevated slide rails 24. The slider blocks 112 support the U-shaped members 102 against downward vertical loads.

The weight of the fifth wheel assembly and trailer tongue loads may impose significant loads on the slider blocks and sliding surfaces, with these loads causing high friction between, and potential wear on, the slider blocks and/or the sliding surfaces. To reduce friction and/or noise, the slider blocks and/or the sliding surfaces may be fabricated from a material having a relatively low or reduced coefficient of friction such as a plastic, such as nylon, which may be Teflon impregnated. As such a material may gradually be worn away, and exhibit a damaged surface, the slider blocks, which do not have an exposed surface, may be fabricated from the reduced friction material. In contrast, the sliding surfaces 36, which are exposed and visible, may be fabricated from a relatively harder material, such as a metal, than are the sliding blocks 112. Such a combination may result in less visible wear of the visible sliding surfaces from the sliding of the slider blocks on the sliding surfaces.

The fifth wheel assembly 22 may be vertically retained to the elevated slide rails 24 against upward vertical load components, which may be due to induced torques and/or improperly loaded trailers. As shown in FIGS. 1, 20, 21 and 24 the elevated slide rails 24 may include a laterally extending rib or projection 116 extending along the length of the slide rail, and the U-shaped members 102 of the fifth wheel assembly 22 may include a corresponding engaging feature 118, such as a shelf or recess, that is configured to engage the laterally extending projection 116 when the fifth wheel assembly 22 is positioned on, or moves along, the slide rails. As shown in FIG. 21, the bolt 104 may generally hold the opposed sides of the U-shaped members 102 together, which may correspondingly maintain the engaging feature 118 in engagement with the laterally extending projection 116. In addition, the bolts 104, even though spaced below the slide rails 24 as shown in FIG. 21, may provide an added measure of retention between the fifth wheel assembly 22 and elevated slide rails 24. Furthermore, the combination of the driving-position stop 106, the maneuvering-position stop 108, the laterally extending projection 116, and the corresponding engaging feature 118 may require that the U-shaped members 102 be slid onto the end of the elevated slide rails 24 prior to installation of the bolts 104, which may then impede or prevent removing the fifth wheel assembly 22 from the elevated slide rails 24.

Figure 20:
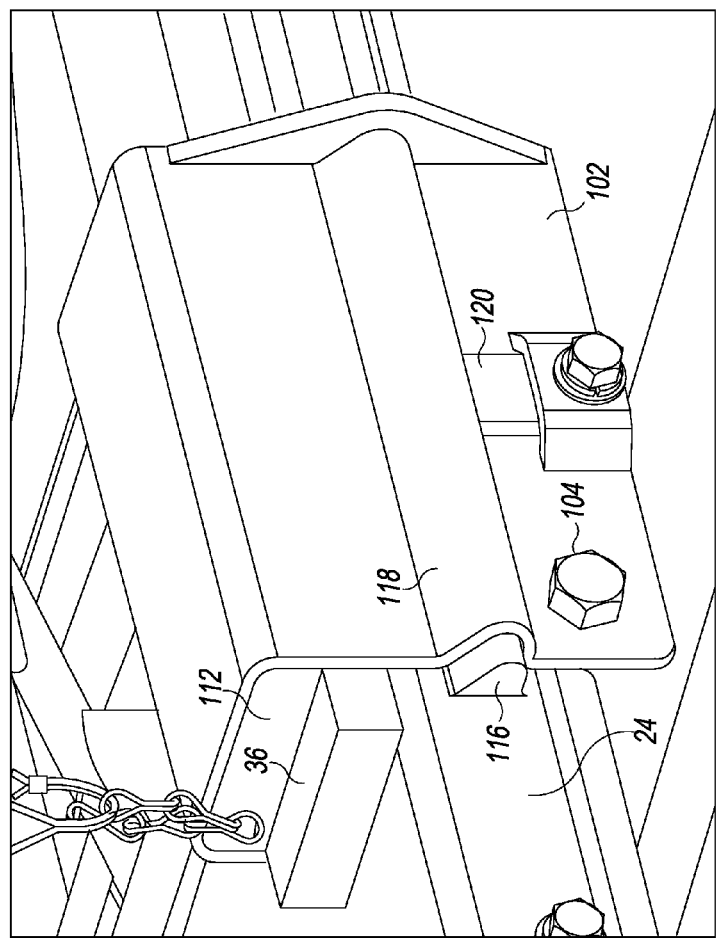
FIG. 20 shows the driver-side U-shaped member of the fifth wheel assembly engaged with driver-side rail of the sliding hitch assembly of FIG. 1.
Figure 21:
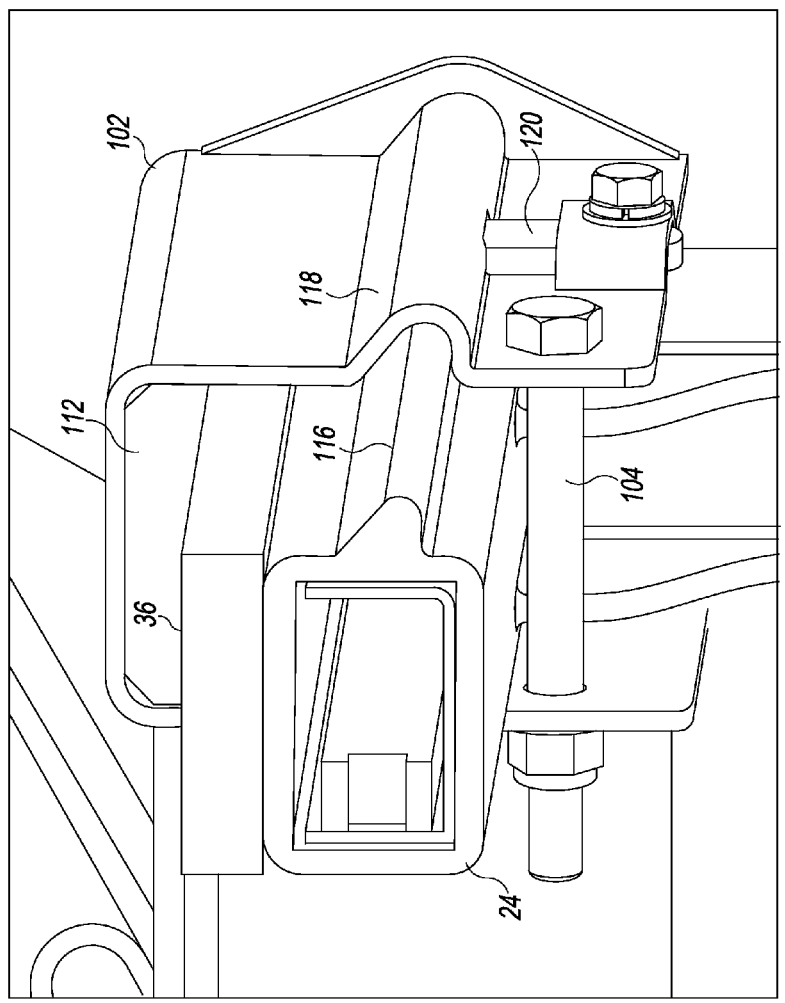
FIG. 21 is a partially broken away view showing the bolt of the driver-side U-shaped bracket below the driver-side rail.

As shown in FIGS. 20 and 21, the laterally extending projection 116, and its corresponding engagement with the engaging feature 118, may extend along a substantial portion of the length of the U-shaped member 102. Such a configuration may improve the support and transmission of torque between the fifth wheel assembly 22 and the elevated slide rails 24.

Figure 24:
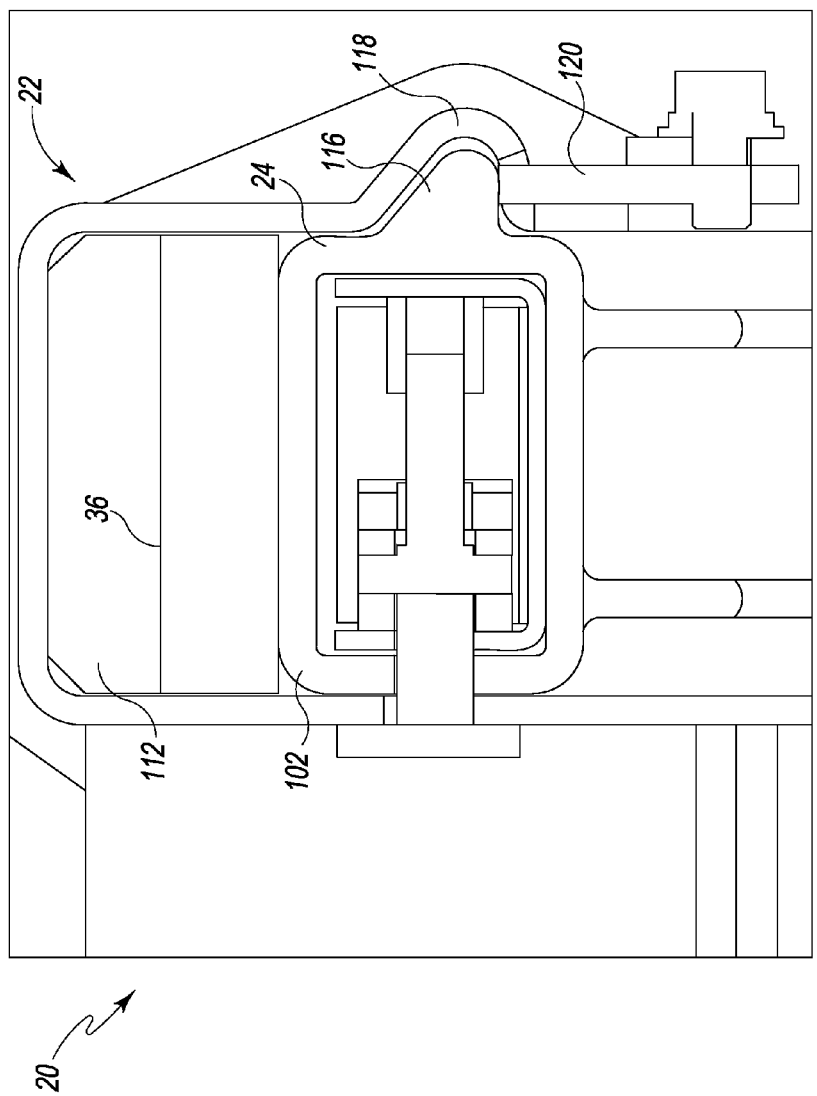
FIG. 24 is a section view showing the wear-compensating mounting of the fifth wheel assembly.

In some examples, the fifth wheel assembly 22 and/or the elevated slide rails 24 may be provided with an adjustment mechanism to address wear to the sliding surfaces 36 and/or the slider blocks 112. Such an adjustment mechanism may address, prevent or reduce loosening of the engagement between the fifth wheel assembly 22 and the elevated slide rails 24. As shown in FIGS. 20, 21 and 24, the U-shaped member 102 may include an adjustable element 120. The adjustable element 120 may be moved upward relative to the U-shaped member 102 to urge the U-shaped member 102 downward, and toward the elevated slide rail 24, as the sliding surface 36 and/or the slider block 112 wears during use. The adjustable element 120 may be movable through a sufficient range of positions to allow maintaining a proper engagement between the fifth wheel assembly 22 and the elevated slide rails 24 over a service life of the sliding hitch assembly.

Figure 25:
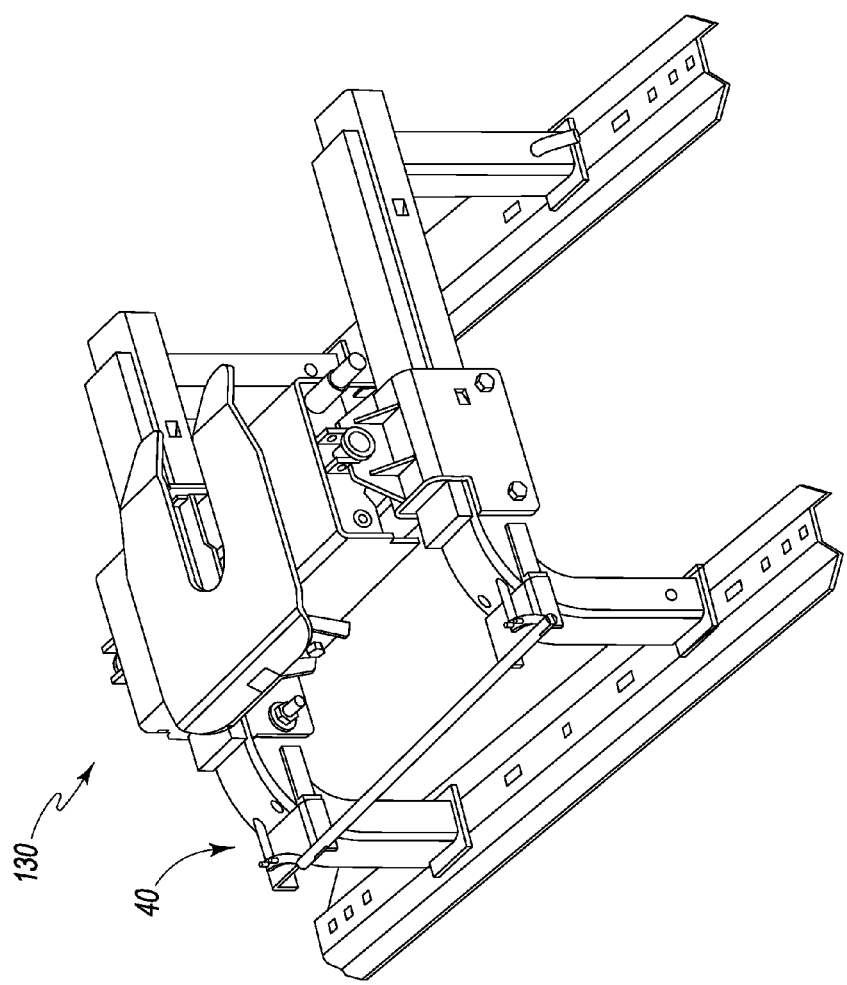
FIG. 25 is a perspective view of another nonexclusive illustrative example of a sliding hitch assembly, shown with the fifth wheel assembly in the driving position.
Figure 26:
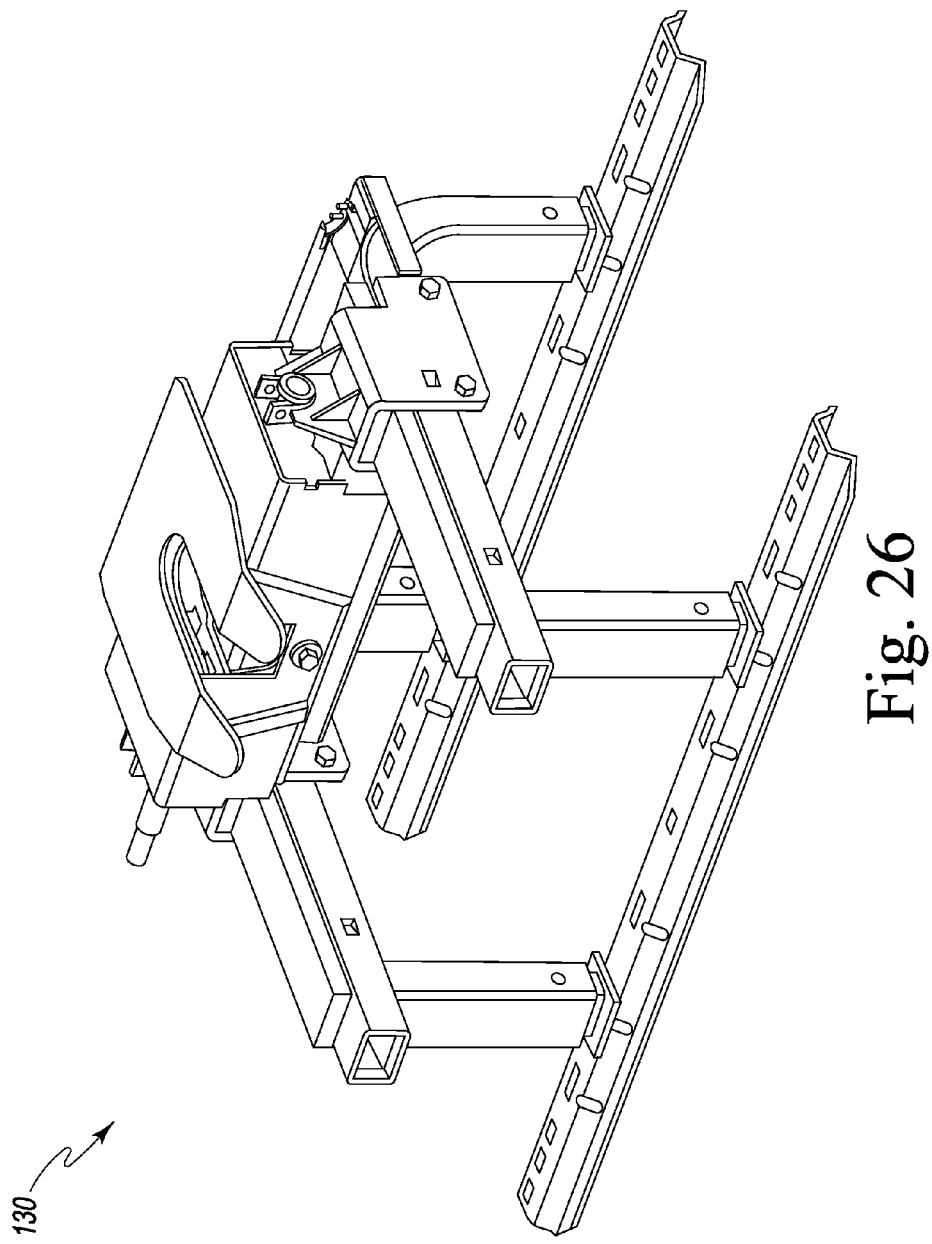
FIG. 26 is another perspective view of the sliding hitch assembly of FIG. 25.
Figure 27:
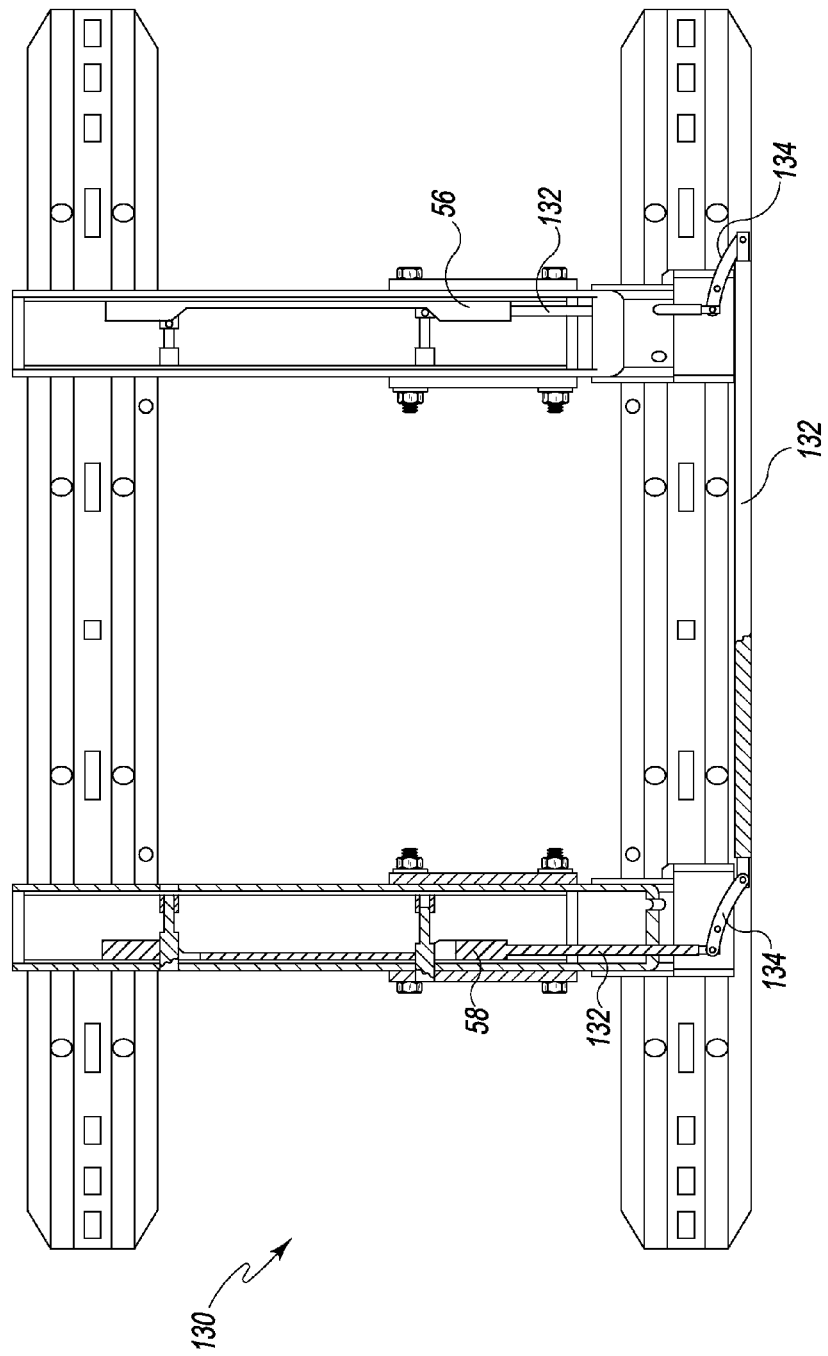
FIG. 27 is a section view showing the locking mechanism of the sliding hitch assembly of FIG. 25, shown with the locking mechanism configured to retain the fifth wheel assembly in the driving position, and with the fifth wheel assembly in the driving position.

Another nonexclusive illustrative example of sliding hitch assembly is shown generally at 130 in FIGS. 25-27. Unless otherwise specified, sliding hitch assembly 130 may, but is not required to, contain at least one of the structures, components, functionalities, concepts, and/or variations described, illustrated, and/or incorporated herein. As shown in FIG. 27, rather than being moved by one or more cables, the first and second cam members 56, 58 may be caused to move by way of a series of rods 132 and pivoting links 134. In addition, rather than having the driving and maneuvering position locking pins extend inwardly, as in the sliding hitch assembly 20 shown in FIGS. 1-24, the driving and maneuvering position locking pins may extend outwardly, as shown in FIGS. 25-27 for the sliding hitch assembly 130.

Given the above disclosure, various alternative descriptions of the sliding hitch assembly are envisioned. For example, we disclose sliding hitch assembly 20 including fifth wheel 22, and a pair of slide rails 24 slidably supporting fifth wheel 22. In some embodiments, each of slide rails 24 includes driving position locking pin 62 or 64, respectively, that selectively locks fifth wheel 22 in a driving position 32, and also includes maneuvering position locking pin 68 or 70, respectively, that selectively locks fifth wheel 22 in maneuvering position 34. As shown in FIG. 12, cam member 56 may be included, with first cam surface 94 that unlocks driving position locking pin 62 when cam member 56 is in a first position, and second cam surface 95 that unlocks maneuvering position locking pin 68 when cam member 56 is in a second position. Optionally, as shown in FIG. 12, cam member 58 may be included, with first cam surface 94 that unlocks driving position locking pin 64 when cam member 58 is in a first position, and second cam surface 95 that unlocks maneuvering position locking pin 70 when cam member 58 is in a second position.

Another embodiment includes sliding hitch assembly 20 with fifth wheel 22 mounted on a pair of downwardly facing U-shaped members 102. Also included is a corresponding pair of slide rails 24, each slidably supporting one of downwardly facing U-shaped members 102, as shown in FIGS. 1 and 2. Locking mechanism 40 is provided, and includes driving position locking pin 62 or 64 that selectively locks one of downwardly facing U-shaped members 102 in driving position 32, as shown in FIGS. 1-4. As in some of the other embodiments, maneuvering position locking pin 68 or 70 selectively locks one of downwardly facing U-shaped members 102 in maneuvering position 34, as shown in FIGS. 7 and 8. Cam member 56 may unlock driving position locking pin 62 when cam member 56 is in a first position, as shown in dashed lines in FIG. 12, and cam member 56 may also unlock maneuvering position locking pin 68 when cam member 56 is in a second position, as shown in solid lines in FIG. 12.

Yet another embodiment includes locking mechanism 40 for sliding fifth wheel assembly 22, with driving position locking pin 62 that selectively locks sliding fifth wheel assembly 22 in driving position 32, and also includes maneuvering position locking pin 68 that selectively locks sliding fifth wheel assembly 22 in maneuvering position 34.

Still other embodiments disclose sliding hitch assembly 20, with fifth wheel jaws 38 mounted on a pair of downwardly facing U-shaped members 102, and a corresponding pair of slide rails 24, each slidably supporting one of downwardly facing U-shaped members 102. Some embodiments include wear block 112 interposed one of slide rails 24 and a corresponding one of U-shaped members 102, as seen best in FIG. 20. Also shown in FIG. 20 is adjustable element 120 that may be moved relative to the corresponding one of the U-shaped members 102 to stay adjacent the one of slide rails 24 as wear block 112 wears during use.

Yet another embodiment includes sliding hitch assembly 20 with fifth wheel 22, slide rail 24 slidably supporting fifth wheel 22, and wear block 112 interposed slide rail 24 and fifth wheel 22, as shown in FIG. 20. Adjustable element 120 may be moved relative to slide rail 24 as wear block 112 wears during use.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure. Where such claims recite "a" or "a first" element or the equivalent thereof, such claims should be understood to include incorporation of one or more such elements, neither requiring nor excluding two or more such elements.

What is claimed is:

1. A sliding hitch assembly, comprising:
    a fifth wheel;
    a pair of slide rails slidably supporting the fifth wheel, each of the slide rails comprising:
        a driving position locking pin that selectively locks the fifth wheel in a driving position;
        a maneuvering position locking pin that selectively locks the fifth wheel in a maneuvering position; and
        a first cam member and a second cam member, each cam member comprising:
            a first cam surface that unlocks the driving position locking pin when the cam member is in a first position, and
            a second cam surface that unlocks the maneuvering position locking pin when the cam member is in a second position;
    wherein the cam members are moved by a position selecting lever via a mechanical connection between the cam members and the position selecting lever that is routed inside at least one of the slide rails.

2. The sliding hitch assembly according to claim 1, wherein the maneuvering position locking pin is spaced from the driving position locking pin.

3. The sliding hitch assembly according to claim 1, wherein each cam member slides relative to a corresponding one of the slide rails.

4. The sliding hitch assembly according to claim 2, wherein sliding each cam member in a direction from the driving position and toward the maneuvering position unlocks a corresponding one of the driving position locking pins.

5. The sliding hitch assembly according to claim 2, wherein sliding the cam member in a direction from the maneuvering position and toward the driving position unlocks a corresponding one of the maneuvering position locking pins.

6. The sliding hitch assembly according to claim 1, wherein each of the slide rails is mounted on a pair of base posts such that a height of the fifth wheel may be adjusted relative to an underlying support surface for the sliding hitch assembly.

7. The sliding hitch assembly according to claim 1, wherein a triangular rib strengthens at least one of the slide rails.

8. A sliding hitch assembly, comprising:
    a fifth wheel;
    a pair of slide rails slidably supporting the fifth wheel, each of the slide rails comprising:
        a driving position locking pin that selectively locks the fifth wheel in a driving position;
        a maneuvering position locking pin that selectively locks the fifth wheel in a maneuvering position; and
        a cam member comprising:
            a first cam surface that unlocks the driving position locking pin when the cam member is in a first position, and
            a second cam surface that unlocks the maneuvering position locking pin when the cam member is in a second position;
    a wear block interposed one of the slide rails and the fifth wheel; and
    an adjustable element that may be moved upward relative to the slide rail as the wear block wears during use.

9. The sliding hitch assembly according to claim 8, wherein the maneuvering position locking pin is spaced from the driving position locking pin.

10. The sliding hitch assembly according to claim 8, wherein each cam member slides relative to a corresponding one of the slide rails.

11. The sliding hitch assembly according to claim 10, wherein sliding each cam member in a direction from the driving position and toward the maneuvering position unlocks a corresponding one of the driving position locking pins.

12. The sliding hitch assembly according to claim 10, wherein sliding the cam member in a direction from the maneuvering position and toward the driving position unlocks a corresponding one of the maneuvering position locking pins.

13. The sliding hitch assembly according to claim 8, wherein each of the slide rails is mounted on a pair of base posts such that a height of the fifth wheel may be adjusted relative to an underlying support surface for the sliding hitch assembly.

14. The sliding hitch assembly according to claim 8, wherein a triangular rib strengthens at least one of the slide rails.

15. A sliding hitch assembly, comprising:
    a fifth wheel mounted on a pair of downwardly facing U-shaped members;

a pair of slide rails, each slidably supporting one of the downwardly facing U-shaped members; and a locking mechanism comprising:

a driving position locking pin that selectively locks one of the downwardly facing U-shaped members in a driving position;

a maneuvering position locking pin that selectively locks one of the downwardly facing U-shaped members in a maneuvering position; and a cam member that unlocks the driving position locking pin when the cam member is in a first position, and that unlocks the maneuvering position locking pin when the cam member is in a second position;

a wear block interposed one of the slide rails and a corresponding one of the U-shaped members; and an adjustable element that may be moved relative to the corresponding one of the U-shaped members to stay adjacent the one of slide rails as the wear block wears during use.

16. The sliding hitch assembly according to claim 15, wherein:

the one of the slide rails includes a laterally extending projection;

the corresponding one of the U-shaped members includes a corresponding engaging recess that is configured to engage the laterally extending projection; and the adjustable element may be moved relative to the corresponding one of the U-shaped members to stay adjacent the laterally extending projection.

17. The sliding hitch assembly according to claim 15, wherein the at least one of the slide rails includes a laterally extending projection, and the corresponding one of the U-shaped members includes a corresponding engaging recess that is configured to engage the laterally extending projection.

18. The sliding hitch assembly according to claim 15, wherein:

the driving position locking pin extends from inside one of the slide rails, through a hole in the slide rail; and a corresponding one of the U-shaped members includes a corresponding hole that is engaged by the driving position locking pin.

19. The sliding hitch assembly according to claim 15, wherein at least one of the U-shaped members is closed off to surround a corresponding one of the slide rails.

20. The sliding hitch assembly according to claim 15, wherein the cam member simultaneously locks the maneuvering position locking pin and unlocks the driving position locking pin when the cam member is in the first position, and simultaneously locks the driving position locking pin and unlocks the maneuvering position locking pin when the cam member is in the second position.

21. The sliding hitch assembly according to claim 20, wherein the cam member comprises:

a first cam surface that unlocks the driving position locking pin when the cam member is in the first position, and a second cam surface that unlocks the maneuvering position locking pin when the cam member is in the second position.

22. The sliding hitch assembly according to claim 20, wherein sliding the cam member in a direction from the driving position and toward the maneuvering position unlocks the driving position locking pin.

23. The sliding hitch assembly according to claim 20, wherein sliding the cam member in a direction from the maneuvering position and toward the driving position unlocks the maneuvering position locking pin.

24. The sliding hitch assembly according to claim 20, wherein the cam member is moved by a position selecting lever.

25. The sliding hitch assembly according to claim 20, wherein the maneuvering position locking pin is spaced from the driving position locking pin.

26. The sliding hitch assembly according to claim 20, wherein the cam member slides relative to a corresponding slide rail.

27. The sliding hitch assembly according to claim 20, wherein each of the slide rails is mounted on a pair of base posts such that a height of the fifth wheel may be adjusted relative to an underlying support surface for the sliding hitch assembly.

28. The sliding hitch assembly according to claim 27, wherein a triangular rib strengthens at least one of the slide rails.

* * * * *